US008384546B2

(12) United States Patent
Foley et al.

(10) Patent No.: US 8,384,546 B2
(45) Date of Patent: Feb. 26, 2013

(54) ENHANCED SECURITY PROTOCOL FOR RADIO FREQUENCY SYSTEMS

(75) Inventors: Joseph T. Foley, Cambridge, MA (US); Sanjay Sarma, Belmont, MA (US); Stephen A. Weis, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1323 days.

(21) Appl. No.: 12/093,564

(22) PCT Filed: Nov. 14, 2006

(86) PCT No.: PCT/US2006/044254
§ 371 (c)(1),
(2), (4) Date: May 13, 2008

(87) PCT Pub. No.: WO2007/056620
PCT Pub. Date: May 18, 2007

(65) Prior Publication Data
US 2008/0297354 A1    Dec. 4, 2008

Related U.S. Application Data

(60) Provisional application No. 60/736,431, filed on Nov. 14, 2005.

(51) Int. Cl.
*G08B 13/14*    (2006.01)
*G06F 21/00*    (2006.01)
(52) U.S. Cl. ............. 340/572.4; 713/185; 340/5.61
(58) Field of Classification Search ............ 340/10.1, 340/10.5, 5.8, 5.61, 572.1–572.9, 5.2, 657; 713/185; 235/375–385
See application file for complete search history.

(56) References Cited

U.S. PATENT DOCUMENTS

| 7,321,300 | B2 * | 1/2008 | Friedrich et al. | 340/539.11 |
| 7,362,212 | B2 * | 4/2008 | Burghard et al. | 340/10.2 |
| 7,450,010 | B1 * | 11/2008 | Gravelle et al. | 340/572.1 |
| 7,750,793 | B2 * | 7/2010 | Juels | 340/10.5 |
| 7,760,073 | B2 * | 7/2010 | Scott et al. | 340/10.1 |
| 8,066,181 | B2 * | 11/2011 | Bishop et al. | 235/380 |
| 8,261,076 | B2 * | 9/2012 | Abendroth et al. | 713/169 |
| 2003/0204743 | A1 | 10/2003 | Devadas et al. | |
| 2004/0066278 | A1 * | 4/2004 | Hughes et al. | 340/10.1 |

(Continued)

FOREIGN PATENT DOCUMENTS

| EP | 0440880 | 8/1991 |
| JP | H03-7399 | 1/1991 |

(Continued)

OTHER PUBLICATIONS

International Search Authority, "International Search Report", International Application No. PCT/US2006/044254, Mar. 2, 2007, 3 pages.

(Continued)

*Primary Examiner* — Benjamin C Lee
*Assistant Examiner* — Sigmund Tang
(74) *Attorney, Agent, or Firm* — Dann, Dorfman, Herrell & Skillman, PC

(57) ABSTRACT

This invention relates to security protocols for RFID systems. Systems and methods are presented to protect the system from hackers attempting to compromise the RFID system. Also, methods and systems for improving RFID security are disclosed. The systems utilize mechanisms to determine the authenticity of the RFID tags used in such systems. The systems and methods also reduce unauthorized access to the RFID system. A system and method to make tags more difficult to compromise or counterfeit is also described.

17 Claims, 27 Drawing Sheets

U.S. PATENT DOCUMENTS

| | | | |
|---|---|---|---|
| 2004/0086121 A1 | 5/2004 | Viggiano et al. | |
| 2006/0022799 A1* | 2/2006 | Juels | 340/10.1 |
| 2008/0106386 A1* | 5/2008 | Li et al. | 340/10.5 |

FOREIGN PATENT DOCUMENTS

| | | |
|---|---|---|
| JP | 2001-169359 | 6/2001 |
| JP | 2005-117460 | 4/2005 |
| JP | 2005-151368 | 6/2005 |

OTHER PUBLICATIONS

Texas Instruments, "Tiris Automatic Recognition of Consumers: Series 5000 Reader System", Feb. 28, 1999, www.ti.com/tiris/docs/manuals/brochures/overview.pdf, pp. 1-14.

Knebelkamp et al, "Latest Generation Technology for Immobilizer Systems" retrieved Jan. 19, 2004, www.ti.com/tiris/docs/manuals/whtapers/immobilizer.pdf, 12 pages.

Lee et al., "A technique to build a secret key in integration circuits for identification and authentication applications", Symposium on VLSI Circuits, Digest of Technical Papers, Jun. 2004, pp. 176-179.

German Patent Office, "Office Action", German Patent Application No. 112006002844.8 Jan. 11, 2010, 18 Pages (including English translation).

Menezes et al. "Handbook of Applied Cryptography", 1997, pp. 397-405.

Japanese Patent Office, "Notice of Reasons for Refusal", Japanese Patent Application No. 2008-541293, Jul. 12, 2011, 8 pages (including English translation).

Japanese Patent Office, "Notice of Reasons for Refusal", Japanese Patent Application No. 2008-541293, Aug. 14, 2012, 10 pages (including English translation).

* cited by examiner

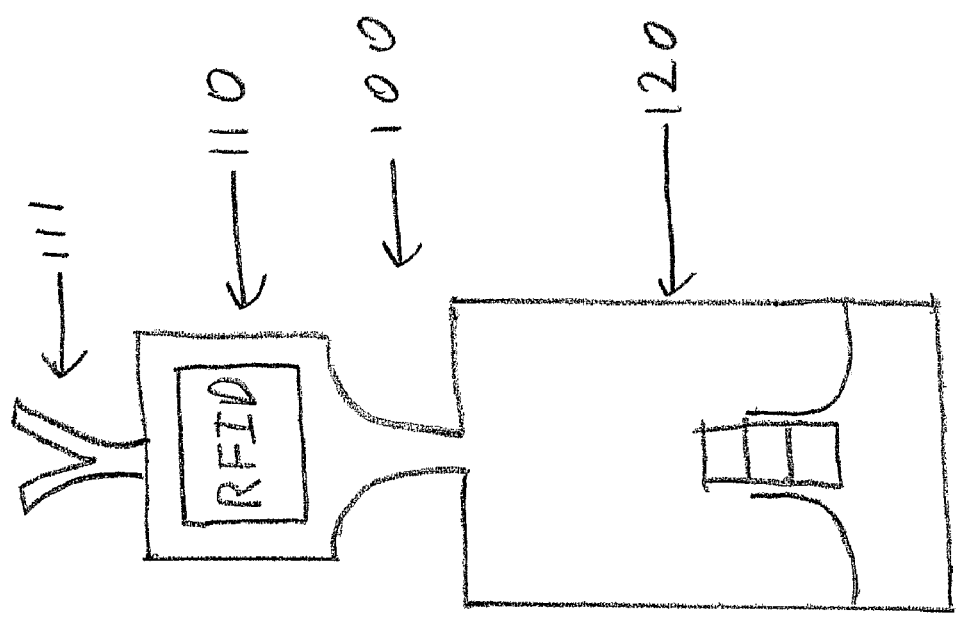

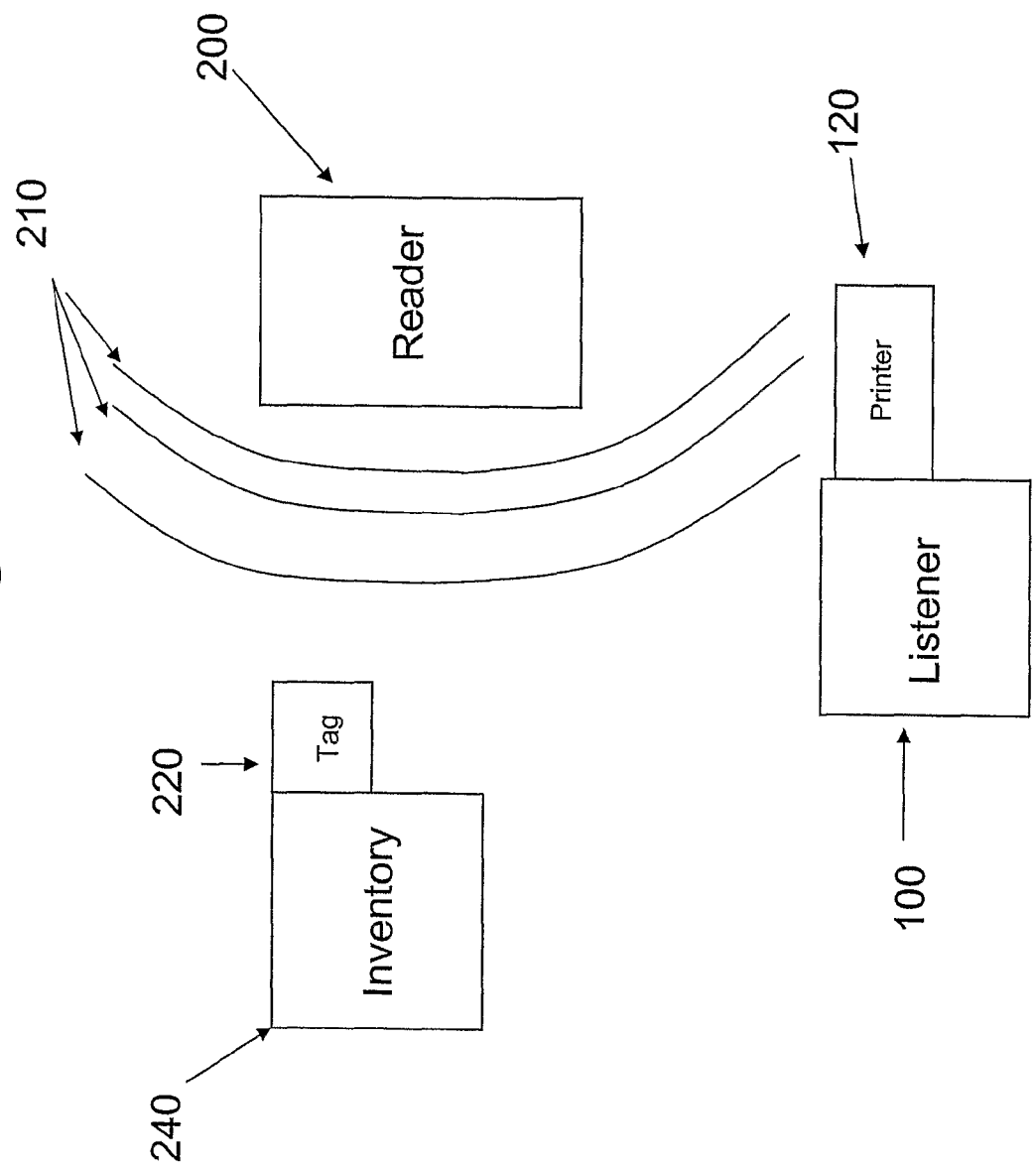

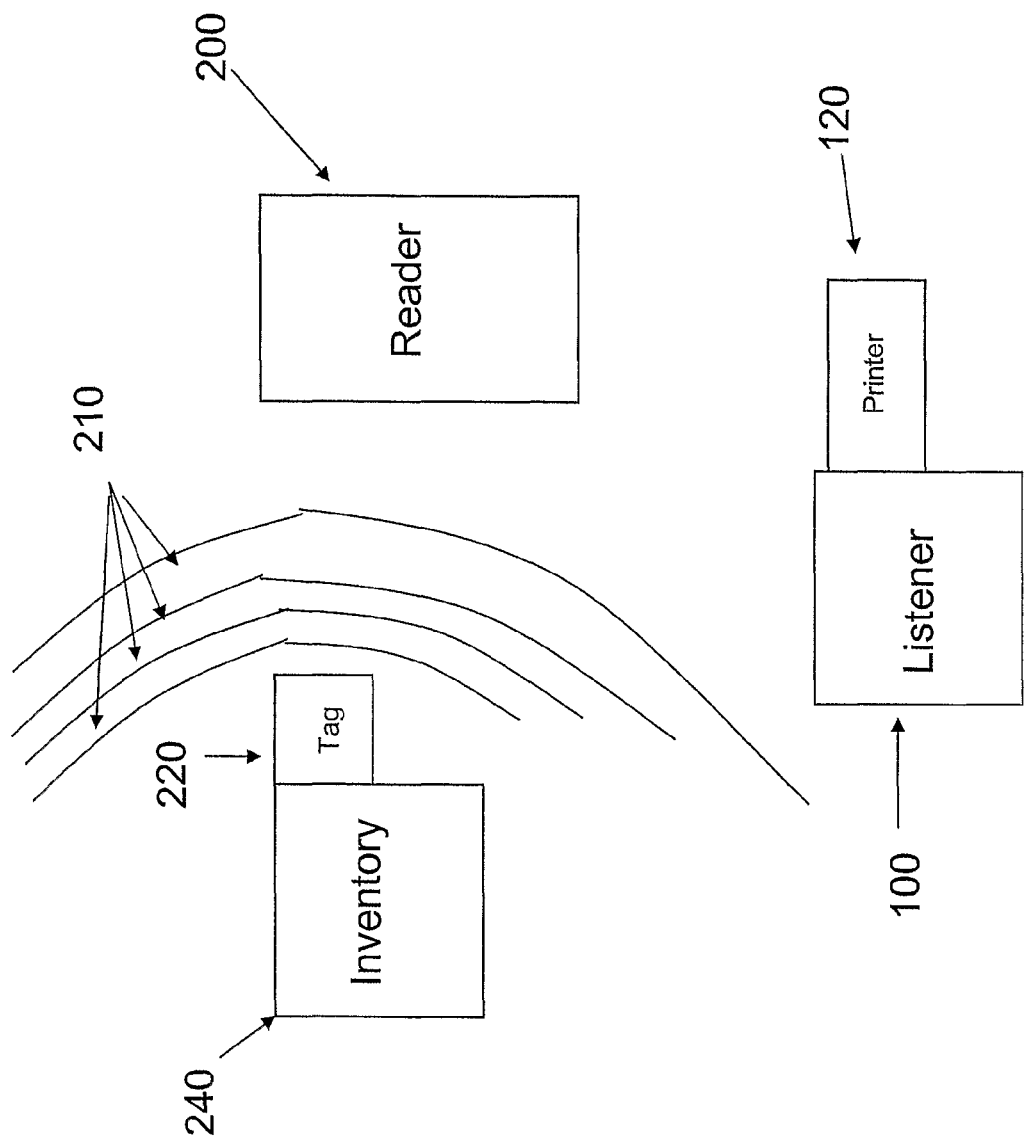

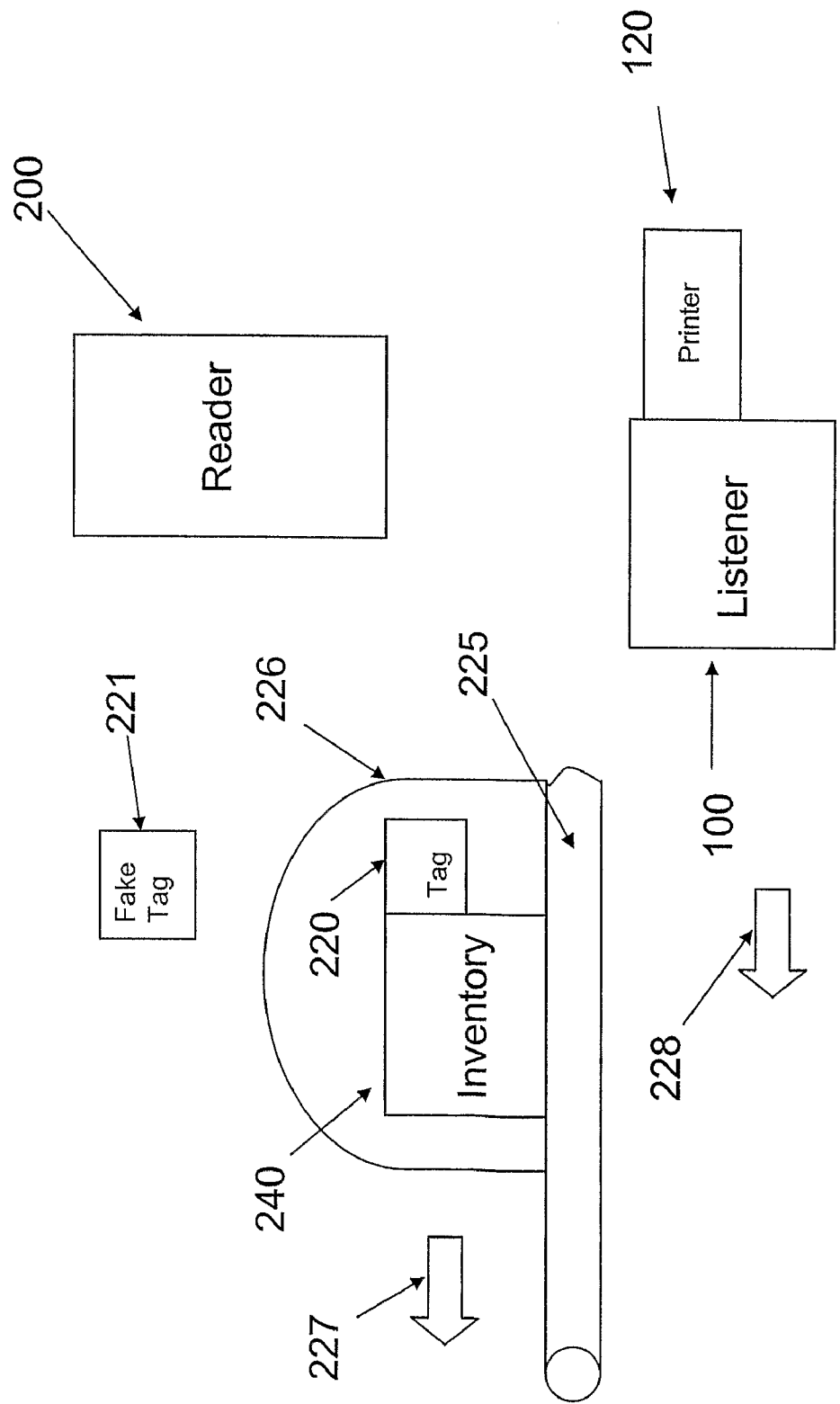

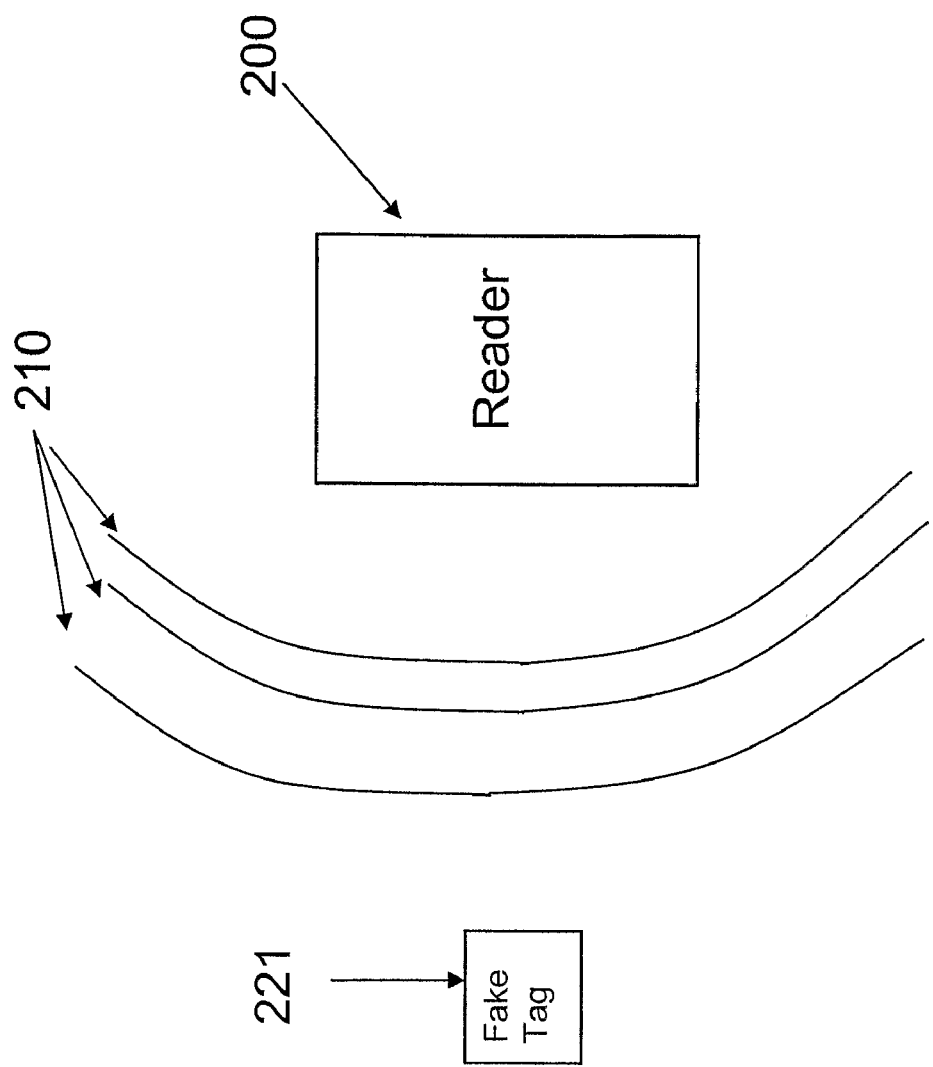

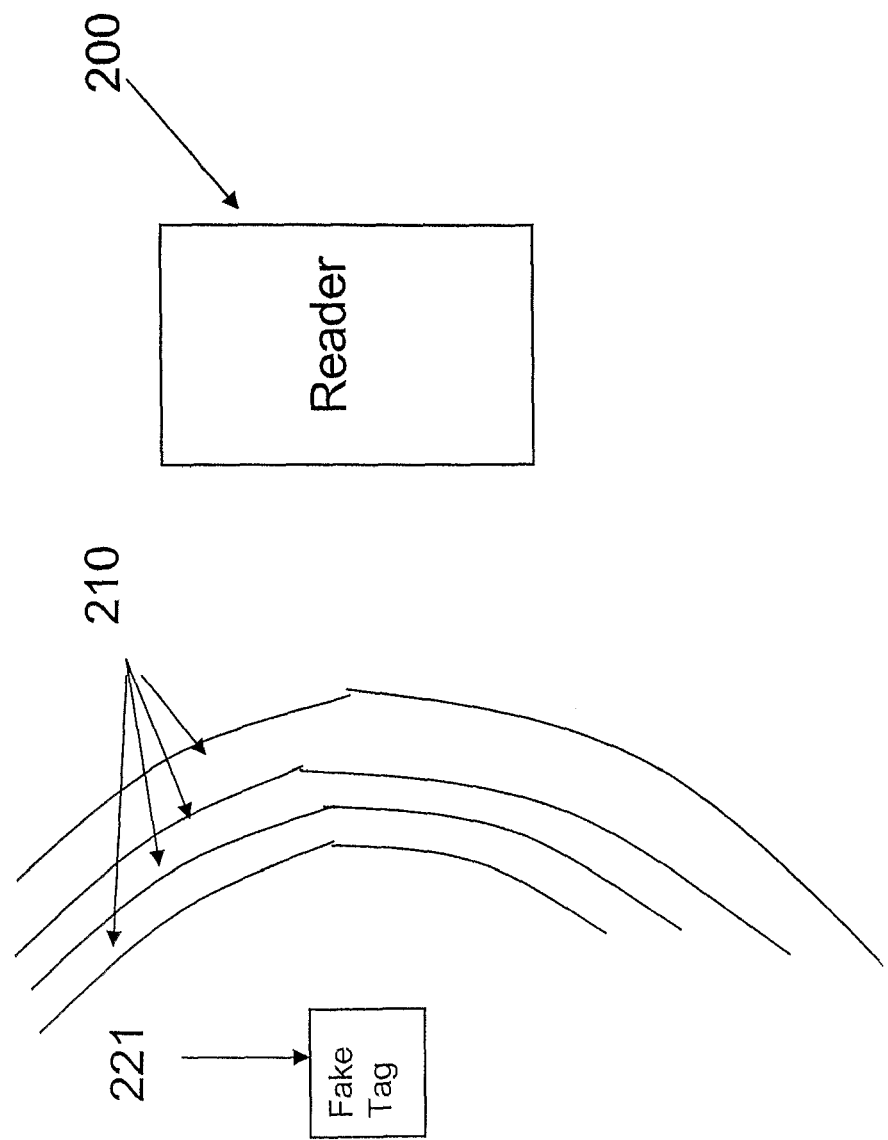

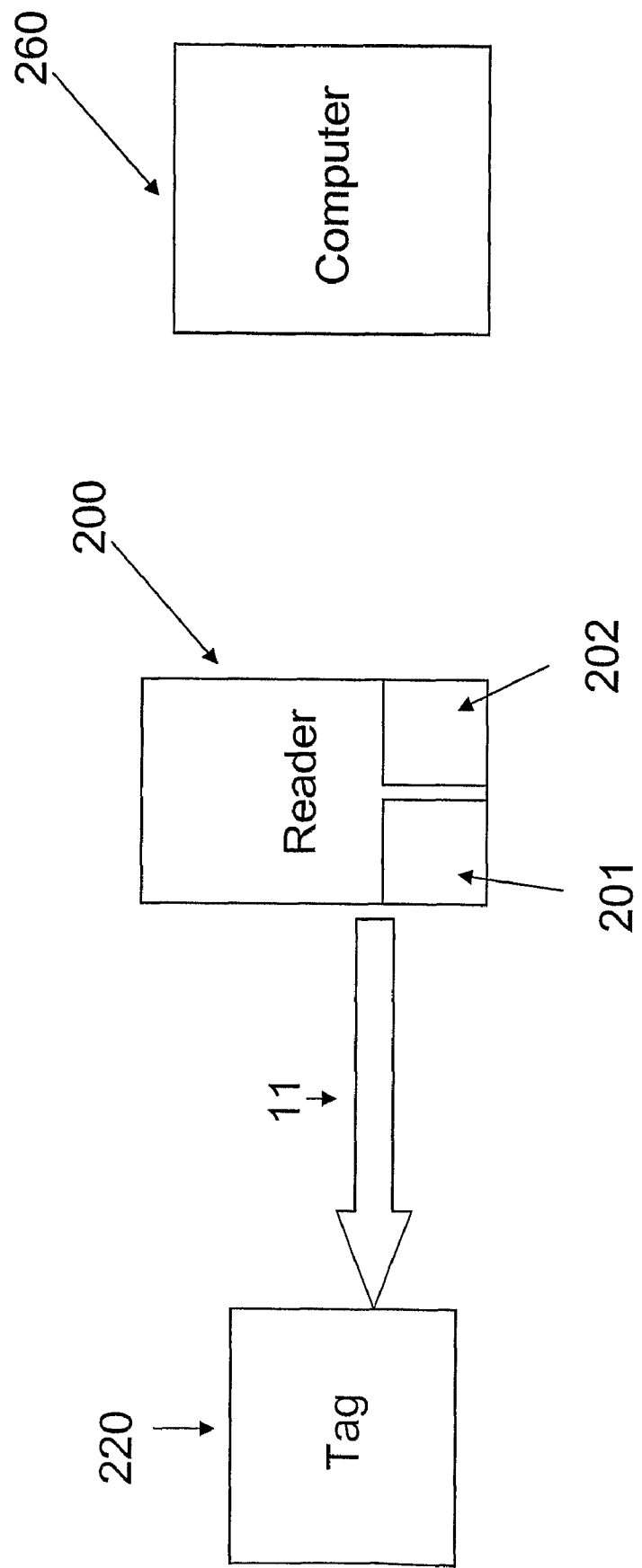

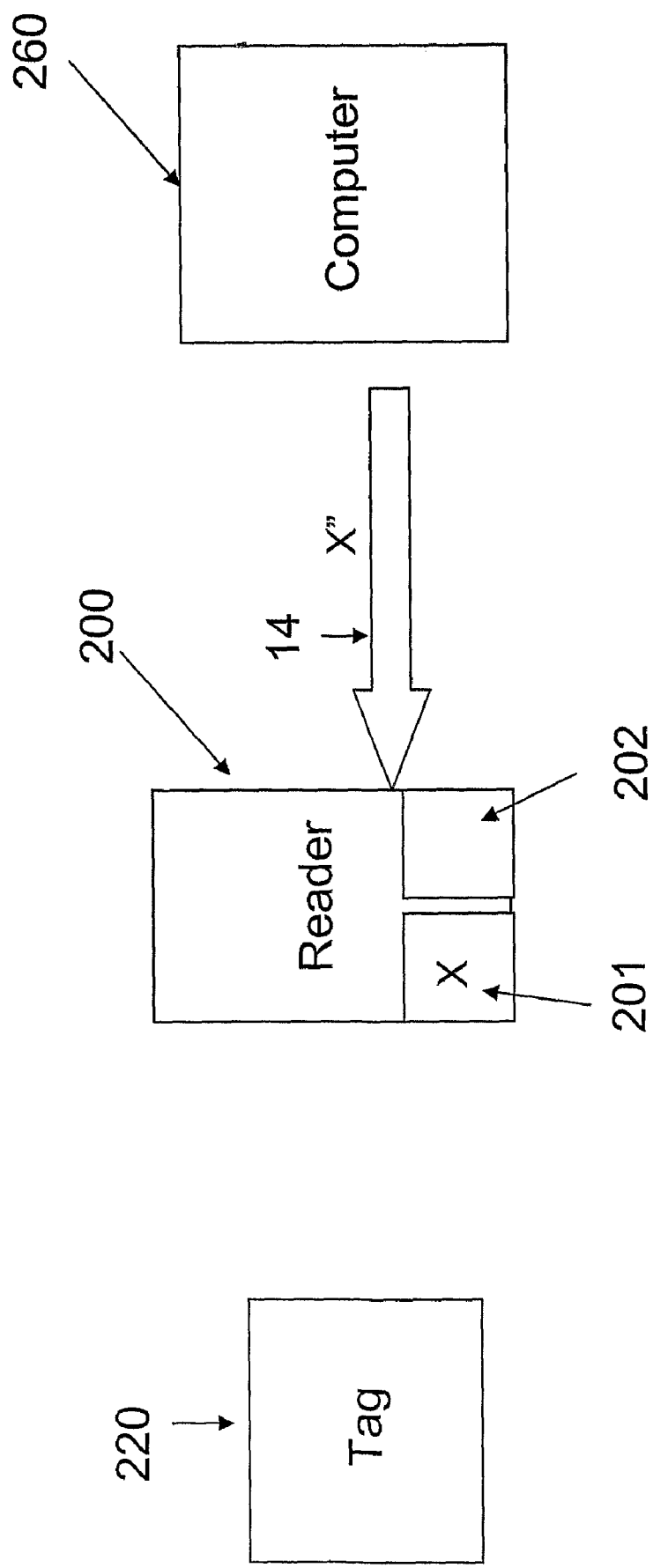

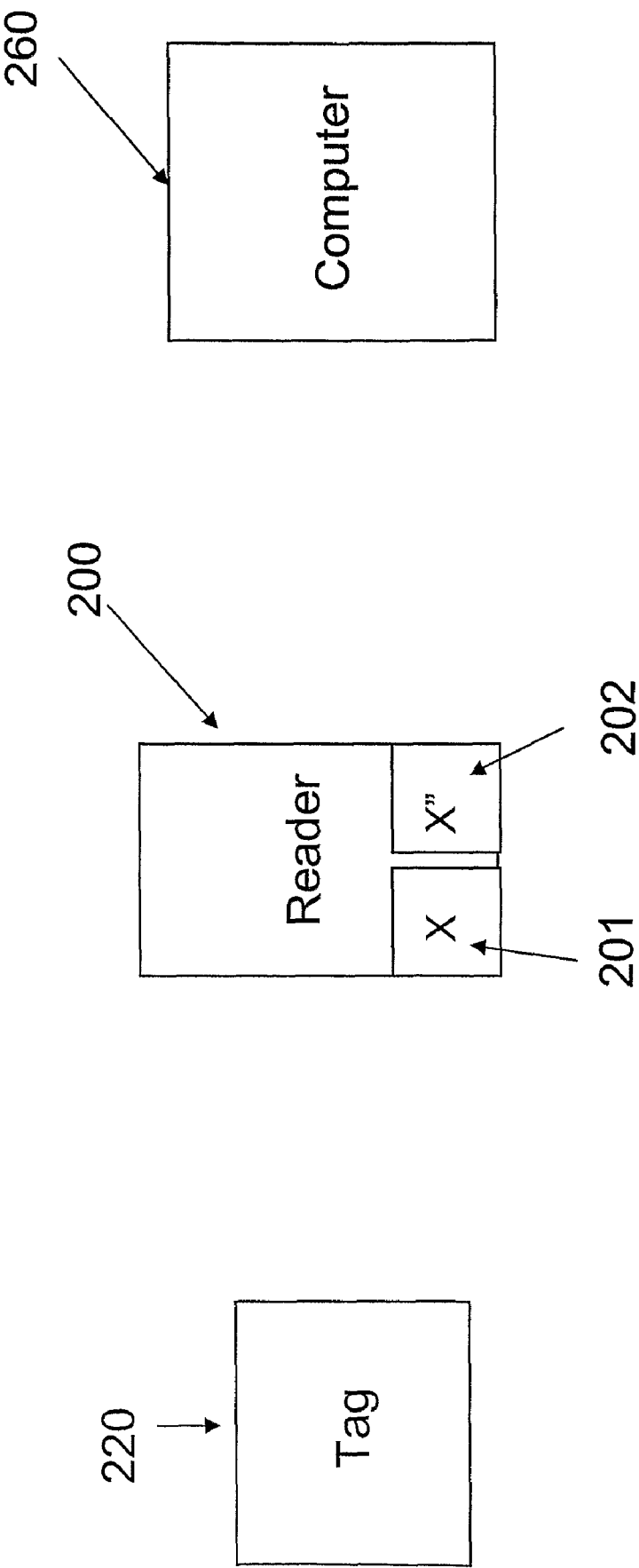

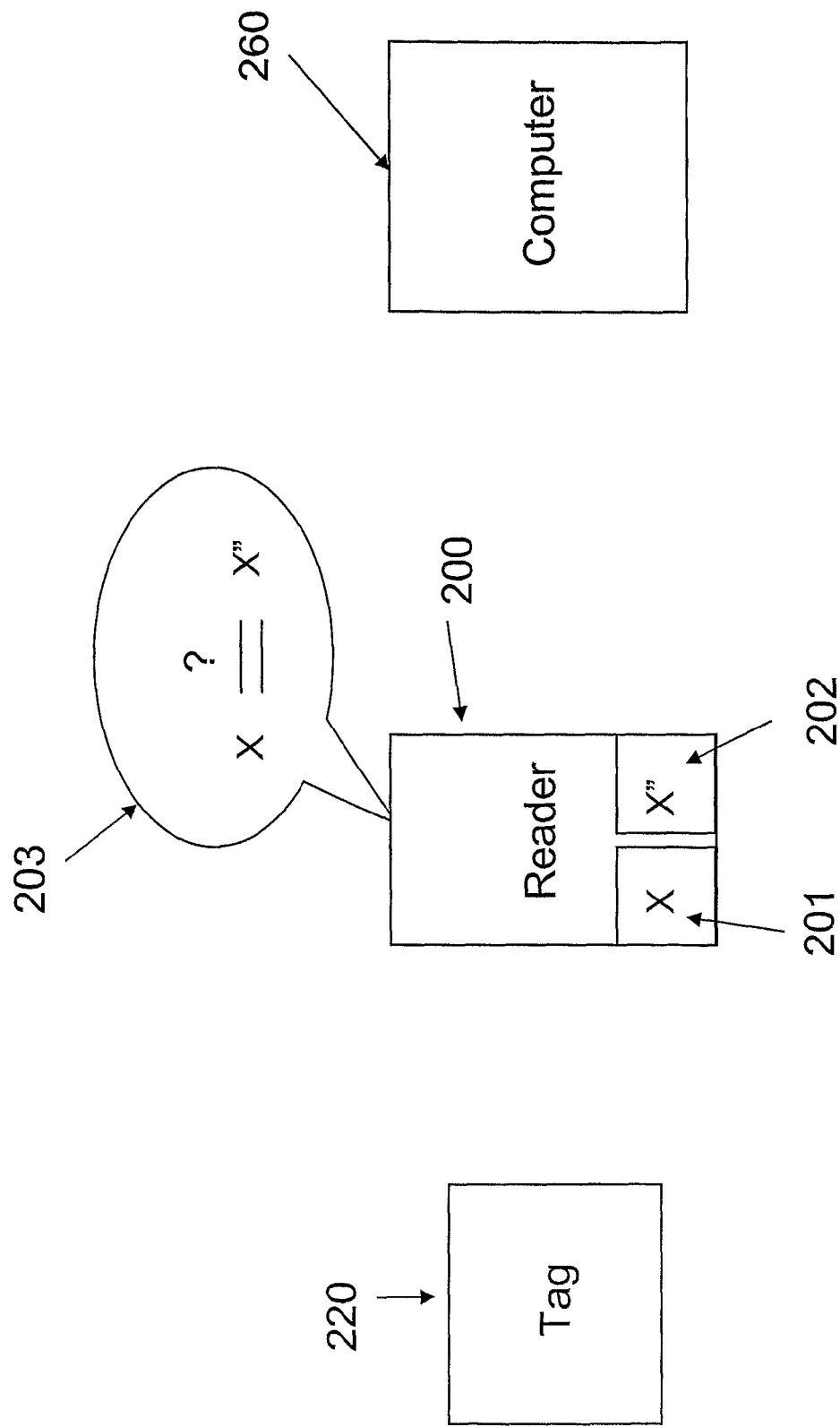

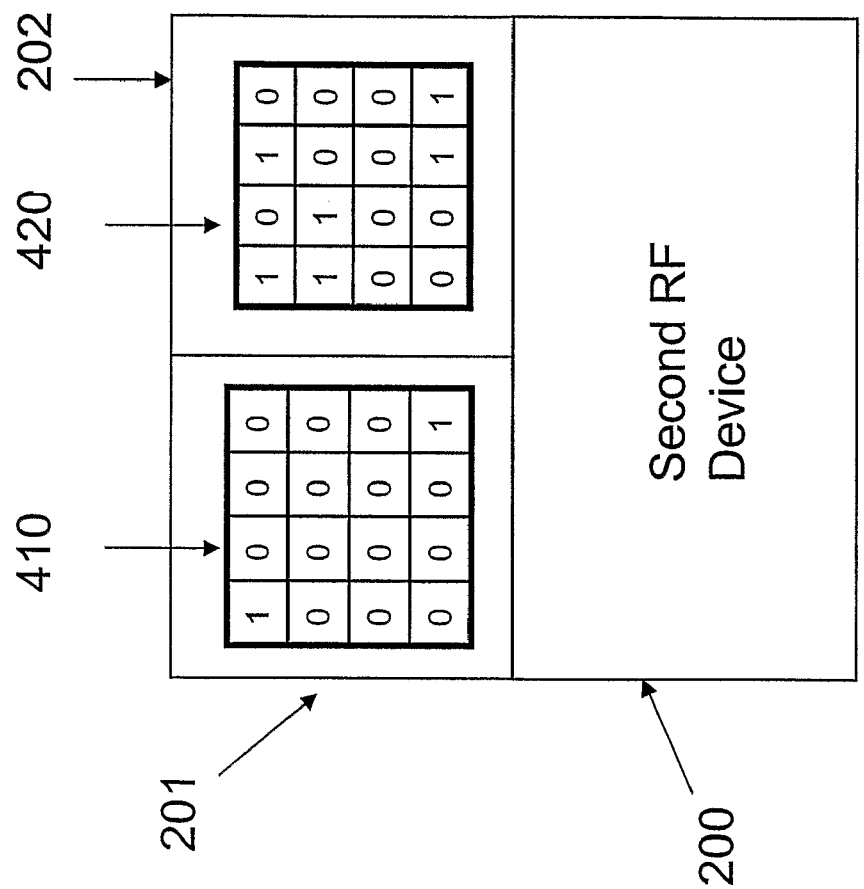

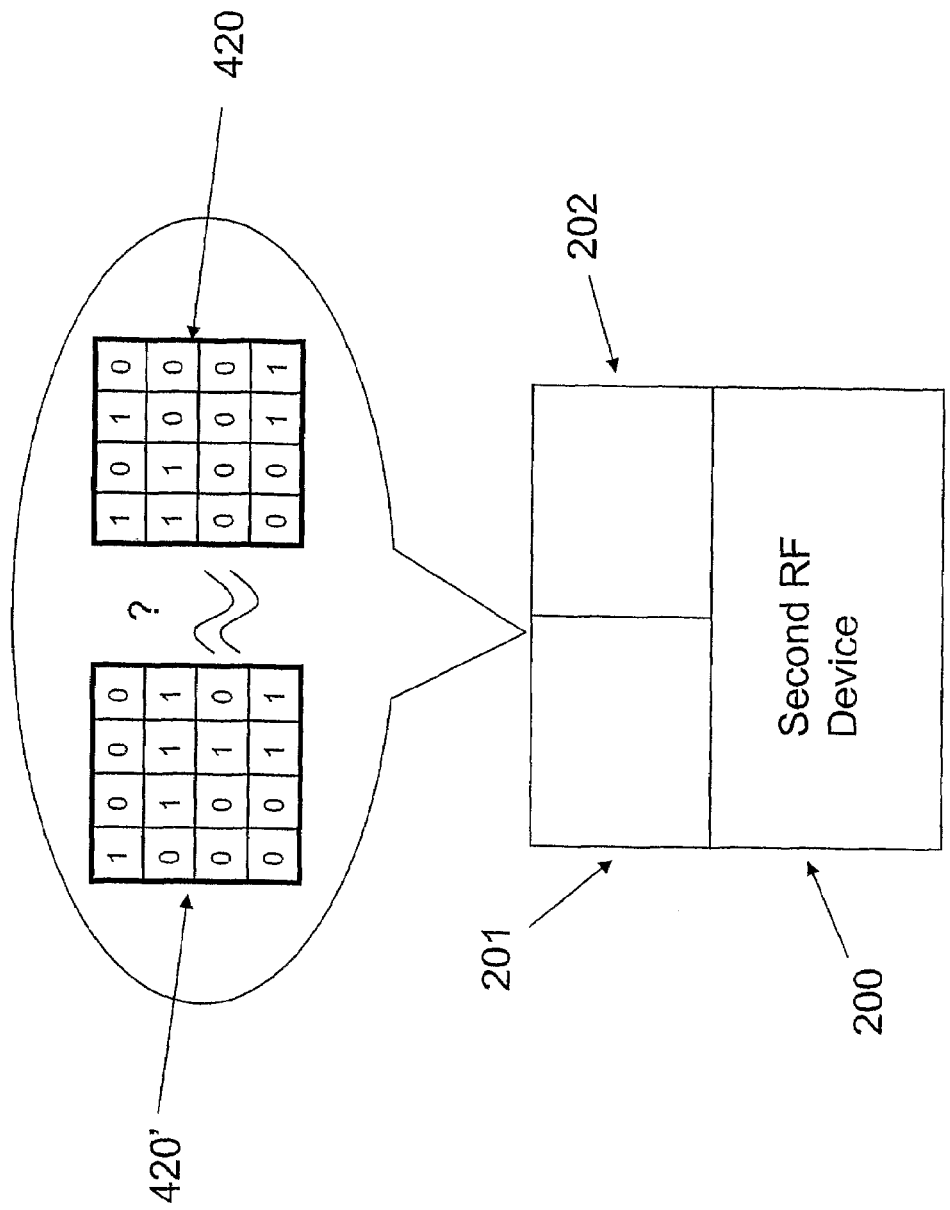

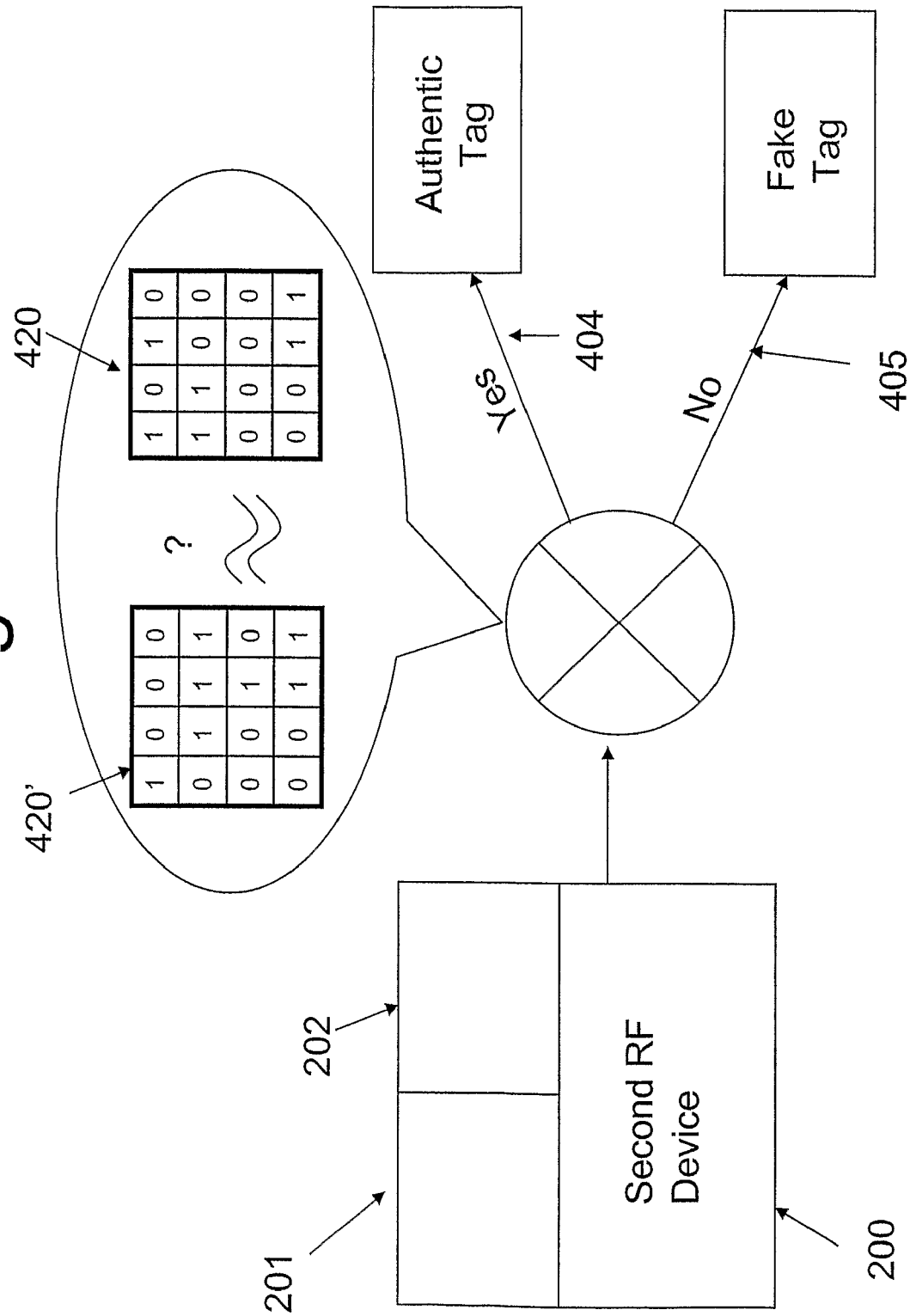

ENHANCED SECURITY PROTOCOL FOR RADIO FREQUENCY SYSTEMS

This application claims the benefit of U.S. Provisional Application No. 60/736,431, filed Nov. 14, 2005.

TECHNICAL FIELD OF THE INVENTION

This invention relates to radio frequency identification devices and methods for using them. More particularly, this invention relates to systems and methods that provide improved ways to find and exploit vulnerabilities in RFID systems. The invention also relates to methods and systems for preventing the exploitation of such vulnerabilities in RFID security systems.

BACKGROUND OF THE INVENTION

A typical RFID system utilizes a RFID transmitter and receiver (which is often combined into one transceiver), at least one RFID tag, and a server. An RFID transceiver is used to read information from the tag and sends that information to the server. The transceiver can communicate with the server either wirelessly or with a hard-wired connection. A typical use for an RFID system includes identifying a product that has an RFID tag attached to it.

The known RFID setup has certain disadvantages which render it vulnerable to third-party intruders or hackers. Especially in a wireless system, the flow of information over the air ways creates a vulnerability to hackers. Advanced techniques for hacking or compromising security systems are useful because they provide a mechanism to test future security protocols.

RFID is superior to optical systems such as barcodes because it provides more flexibility on the size of the numbers that can be used. Regardless of the manner in which the identification number is stored on an RFID tag, a properly designed identification number should be unique. Given a unique number, it is possible to associate a variety of information with it. Unfortunately, having a unique number alone is not enough to verify ownership of the number or the associated information. A malicious intruder or hacker can easily read the number while it is being transmitted. The intruder would then be able to relay the number in order to falsify ownership of the number. Accordingly, a security means is needed to prove that an RFID tag is an actual physical entity and not just a number.

SUMMARY OF THE INVENTION

In accordance with a first aspect of the present invention, a method and system is provided for providing security in an RFID system. The method incorporates transmitting a challenge to an RFID tag. The tag generates a first response by performing at least one mathematical function using the challenge and a secret. The secret is data stored on the tag that is not known to the data reader. Data is then transmitting data to a verification device. The data may comprise either the response from the tag, or the challenge itself. The verification device uses its own secret to process the data the verification device receives. The verification device or the reader may then compare data generated by the verification device and the tag.

BRIEF DESCRIPTION OF THE FIGURES

FIG. 1, is a schematic diagram of an embodiment of a listener used in connection with one aspect of the present invention.

FIGS. 2A-2G, are schematic diagrams of the steps of a method of compromising an RF system.

FIGS. 4A-4G, are schematic diagrams that show the steps of a method of providing security in an RFID tag system.

FIGS. 5A-5K, are schematic diagrams of the steps performed in using a Noisy Bloom Filter Process in the RFID security tag system of FIGS. 4A-4G.

DETAILED DESCRIPTION

Figure 2C:
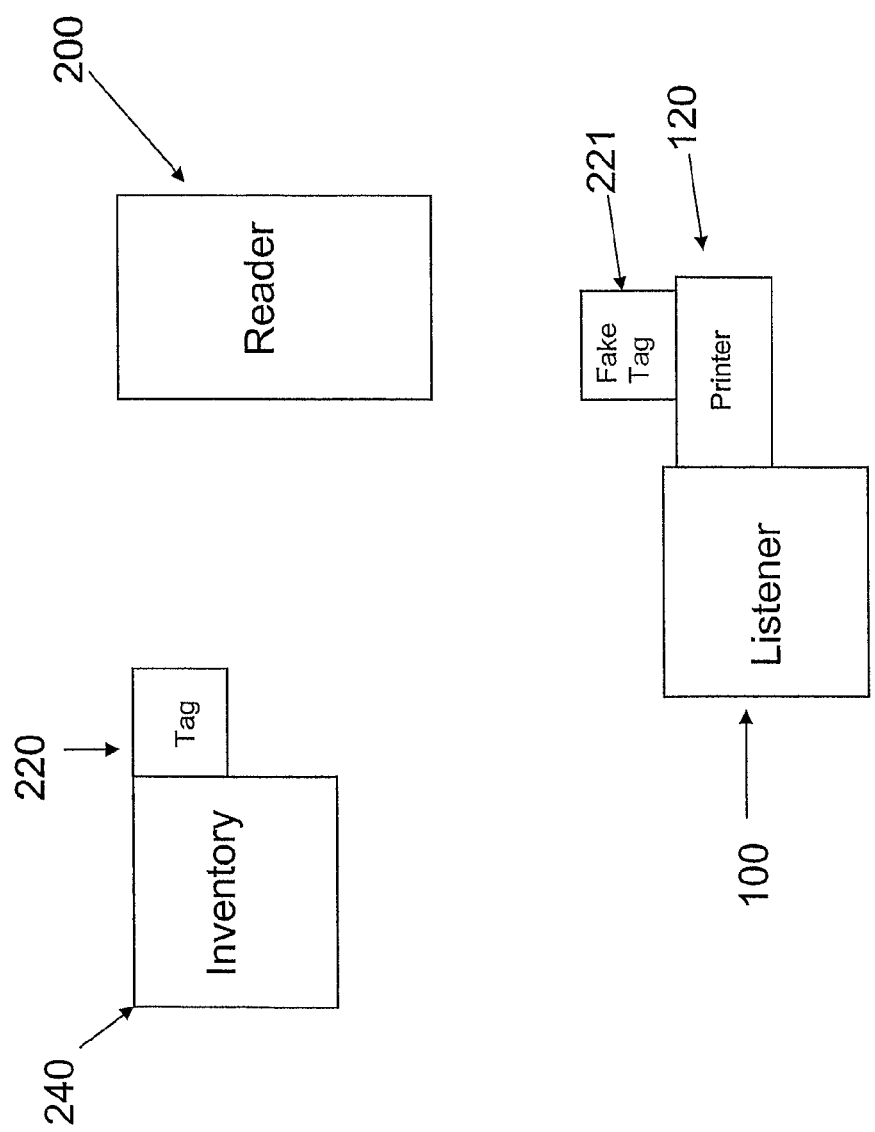

In accordance with one aspect of the present invention, there is provided a method of compromising an RFID system by using a listener. As shown in FIG. 1, a listener 100 comprises inter alia a transceiver 110, configured to receive an RF transmission at the RFID frequency 13.56 MHz and to record the signal's waveform on a recording medium such as Random Access Memory (RAM) (not shown). Other frequencies can be used such as 8.2 MHz or 2.45 GHz. The transceiver has an antenna 111. The use of the listener 111 to compromise an RF system is described with reference to FIGS. 2A-2G.

Generally, an RF reader or transceiver 200 sends a signal 210 with data encrypted in the signal that instructs the tag 220 to send a reply 230 to the reader 200. In a typical embodiment, the tag 220 is attached to a commercial item 240 or its packaging. In some embodiments of this method, the listener 100 is a passive device that simply receives a signal from the RFID tag 220 that is activated by the RFID reader 200. However, an active listener is also contemplated that could activate the tag using its own transmitter. Even if the signal transmitted to the tag is encrypted, the listener 100 can still capture and record the encrypted signal. FIG. 2B shows the step of the listener 100 capturing the tag's transmission. With the transmission recorded, the information can be used to manufacture a counterfeit tag which can generate the same signal as the true tag.

FIG. 2C shows the step of the listener 100 using an associated printer 120 to print a fake or counterfeit tag 221. The listener 100 may have printer 120 integrally built into the housing of the listener (not shown). Other embodiments of a listener may include separate housings for the transceiver and the printer (shown in FIG. 1). The printer and housing optionally can include a connector to electrically and mechanically connect the printer and transceiver so that the two systems function as an integrated unit.

In many RFID systems, if a product is removed from an RF field without first being deactivated at a register, an alarm will ring to alert the store owner that the item has been removed without proper deactivation. Generally, an RFID store system will intermittently query the RFID tag to ensure its presence in the RF field. The inventory database is updated by a store employee so that when an item is legitimately purchased, the system is updated to ignore the absence of the tag attached to the purchased article. Theft of the product with the attached tag or the store's failure to properly remove or deactivate the tag alerts the system of a theft in progress.

Figure 2D:
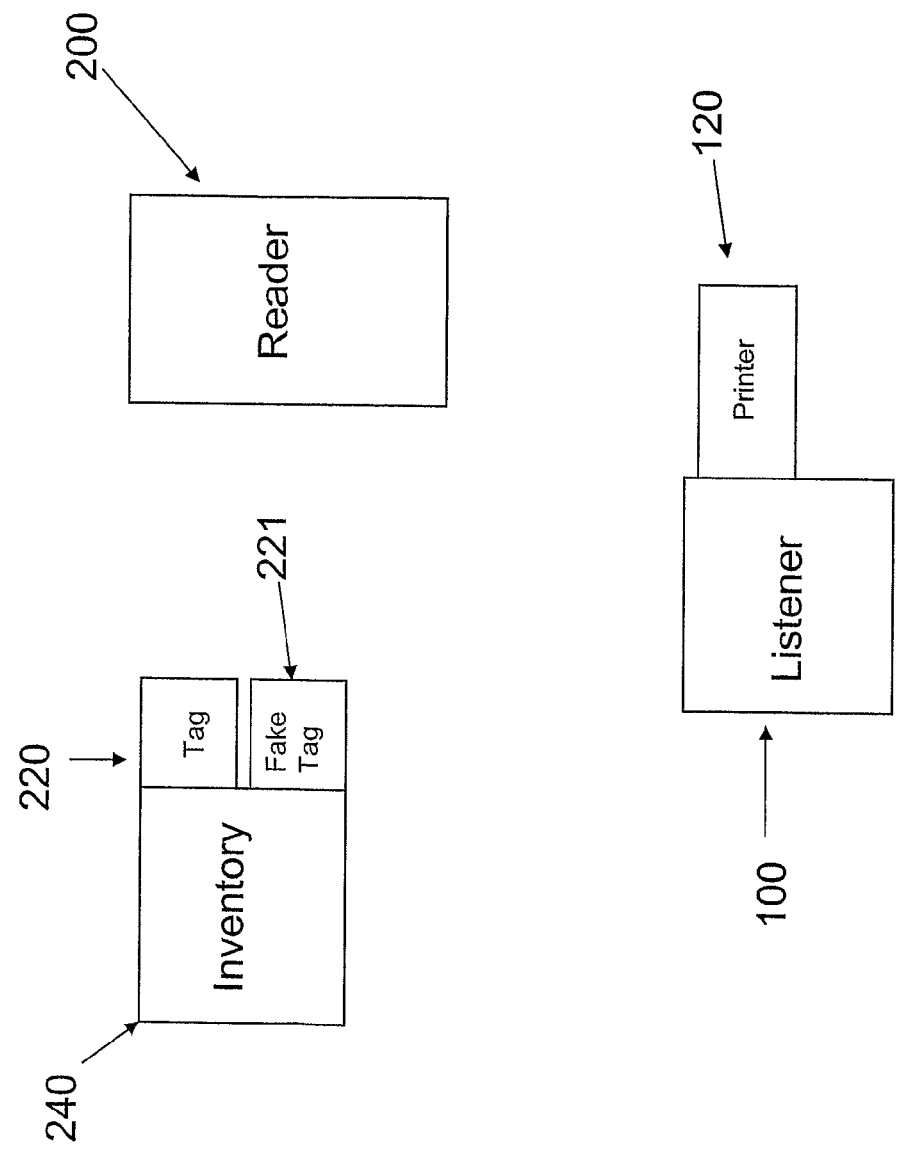

A thief, knowing the identity of the transmission signal through the use of the listener, can print a counterfeit duplicate tag 221, as shown in FIG. 2C, and introduce the counterfeit tag into the system, as shown in FIG. 2D. When the real RFID tag and its corresponding product are removed from the store, the counterfeit tag will still be in place when the store transceiver transmits the query signal. Arrows 227 and 228 represent the inventory item 240 with attached tag 220, and the listener 100 (with attached printer 120), being removed from the system. This symbolizes a thief removing the product from the store and taking his listener 100 with him or her.

The store transceiver will not be able detect that an RFID tag and its associated product are missing, as shown in FIGS. 2F and 2G.

In response to the security breaching process described above, systems to improve RFID security have been developed in accordance with another aspect of the present invention. The systems may be utilized together or separately depending on the commercial needs of the system owner. The improved security procedures according to the present invention are contemplated for use in any system where a user needs a higher level of security. A user might need more security if he or she were implementing an object name service (ONS). An ONS system provides a database linking an RFID tag code or related information to a descriptive data table about the item. The ONS system provides the users with an abundance of information about a product which may include the expiration date, price, category, place of origin, or a text based description. Additional information fields can be created as required by the users depending on the type of product involved. While this system provides the users with needed and useful information, it may present a weakness in the security of the system. A person with a listener can capture the information signal transmitted from an RFID tag, and can use the captured signal to determine the identity of the tagged item and possibly other products. A system for improving the security of an RFID tag system of the current invention includes at least one of the following:

1. a Controlled Physical Random Function (CPRF);
2. a procedure for verifying the authenticity of an RFID tag; and
3. a Noisy Bloom Filter.

Controlled Physical Random Function

An RFID security system according to the present invention may use a random number generator which requires a seed value for the random number. Creating a truly random number is difficult for a machine to do because the software usually starts with some fixed value or uses a constantly changing value (time of day for example) to calculate a seed value. This type of system is generally not practicable with RFID tags. Many RFID tags do not contain a battery, and therefore cannot actively maintain time. While an RFID reader could provide the tag with the time, providing the time effectively allows the reader to determine the tag's starting position for random number generation. This makes the random number much easier to forge, which can cause security problems.

Figure 3:
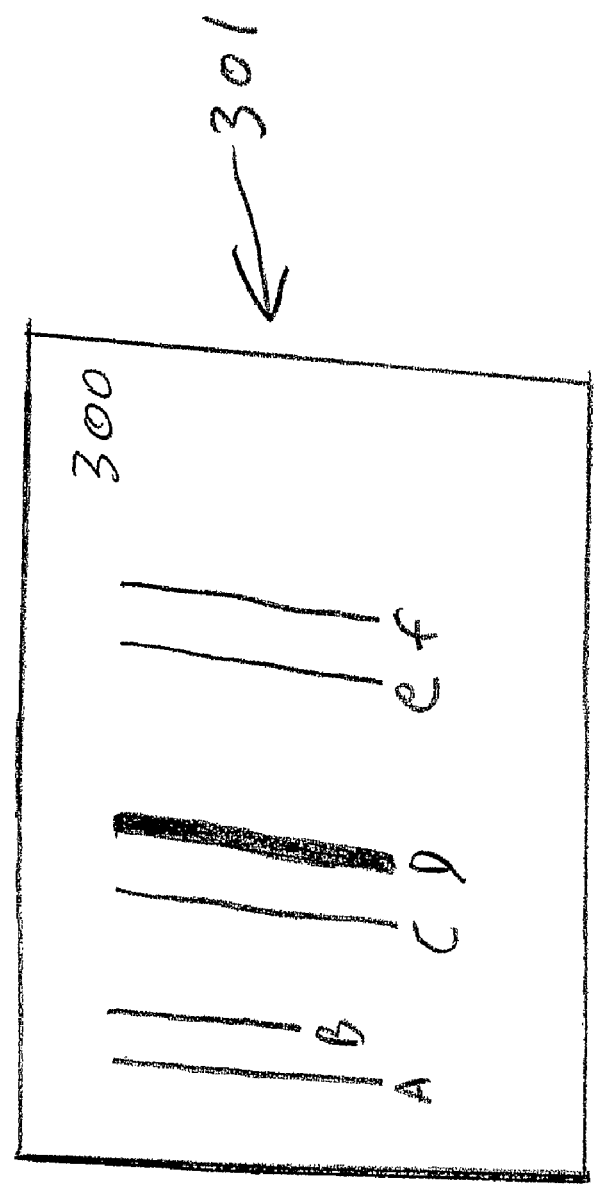
FIG. 3, is a schematic diagram of a microprocessor with pairs of wires.

To help solve this dilemma, a controlled physical random function may be used. Nearly all RFID tags include an integrated circuit. Referring now to FIG. 3, there is shown an integrated circuit 301 having a plurality of microscopic wires A-F formed in a silicon substrate 300. The controlled physical random function utilizes the imperfections in the silicon material of the integrated circuit 301 on the RFID tag to generate a truly random seed value. The integrated circuit has millions of microscopic wires or other conductive traces or channels built into the silicon substrate 300. Wires A, B, C, D, E, and F are representative of the plurality of wires present in the RFID tag integrated circuit. A real silicon chip would have many more wires. Wires A-F are not drawn to scale and their differences are exaggerated to make the illustration of this method easier to understand.

The tolerances used in the chip creation process yield wires that are not all exactly the same length or thickness. For example, wires A and B are not the same length, and wires C and D are not the same thickness. Wires E and F are substantially the same length and thickness. A difference in wire thickness or length results in a difference in the amount of time it takes for electrons to pass through the wire. Software can be incorporated into the memory of the integrated circuit to provide instructions for the integrated circuit to send electricity across a pair of these wires. The difference in the time it takes the electricity to flow across the pair is measured. This difference in time will be exceedingly small. The software will therefore need to run electricity along the wires a large number times, with each cycle being executed continuously, to generate measurable difference. Each cycle of electricity through the wires may be made proportional to the number of times the tag processor executes a loop in the software. Further, each cycle of electricity may correspond to an iteration of an executed loop in the tag software's code. This technique makes coding the software simpler. Complex multiples and nonlinear equations can be avoided if each electrical signal that flows across a wire corresponds to an executed loop in the software.

The tag software instructs the integrated circuit to run power across each wire for a certain amount of time. The software can then calculate this time difference by receiving a start and end time from the RFID reader or have other self-integrated software maintains its own internal time. There are many ways a software program can be designed to implement such a time comparison system. The software system discussed here is simply one method of implementing a comparison detection, but other methods can be substituted as appropriate.

The software may enumerate the number of times the test loop is executed by maintaining a sentinel variable in the code or by utilizing other known methods. The code can then be executed, and electricity is allowed to flow across the wires. The sentinel values are then compared. If the first wire has the higher corresponding sentinel value, the seed string is concatenated with the character '1', otherwise, the string is concatenated with a seed value of '0'. Naturally, the inverse of the foregoing scheme is also contemplated wherein the seed string is concatenated with the character '0' if the first wire has the higher corresponding sentinel value. Also, there is no restriction to using 0's and 1's, any two characters or strings could be used.

The process is repeated for other wires and can be repeated a predetermined number of times. This number can be hard-coded in the tag, randomly generated, or set by the reader. The following method example implements the algorithm just described:

1. The string "SEED" is initialized to null or zero.
2. Wire A and Wire B of the silicon wafer are provided on the integrated circuit.
3. A timer in the software program is provided by the reader or by other known mechanisms.
4. The timer is set to run for T seconds.
5. The loop software is run across wire A with the Sentinal A incrementing after each iteration.
6. The software stops running after T seconds and the value of Sentinal A is stored in the integrated circuit's memory.
7. Steps 1-6 are repeated for wire B and Sentinal B.
8. If Sentinal A is greater than or equal to Sentinal B, then "SEED" is concatenated with a '1'.
9. Otherwise, "SEED" is concatenated with a '0'.
10. Steps 2-9 are repeated for wires C & D, then wires E & F, and so on.

This process can be performed on any number of wires or conductive channels, up to all of the wires or channels in the IC.

An example of the resulting value of SEED might be 10010101100001101, which is a binary number that can be used as the seed value for random number generation by the tag. To further randomize the seed value, the order of the wires can be altered or the amount of time T can be altered. The software instructions create a type of race condition in the hardware to generate the random number. Additionally, various environmental factors such as temperature and humidity will likely cause the number to be different every time the algorithm is run, because these factors affect the result of a circuit testing the race condition in the wires. The advantage of using this technique to generate a random seed value is that each tag will have its own unique, random seed. The seed value cannot be forged or estimated by a hacker because it is essentially hard-coded into the tag. Having a truly random seed value provides a useful advantage to building a more secure system.

The step of concatenation of the string to generate a binary number is interchangeable with a variety of other counting mechanisms. Another method of generating a number could entail moving left or right along a number line depending on the outcome of the number of loops of the software. Also, a group of random numbers could be placed in a virtual bucket and each time a zero is generated by the race condition, the program retains the current number, and each time a one is chosen the program generates a new number.

*Controlled Physical Random Functions* and *Silicon Physical Random Functions* both published in 2002 by Gassend et al working for the Massachusetts Institute of Technology and incorporated by reference herein describe controlled physical random functions.

RFID Tag Authentication

Real RFID systems can use X number of tags, Y number of readers, and Z number of computers in a wide range of different networking configurations and reader systems, where X, Y, and Z each represent a number between 0-infinity. The RFID tag authentication technique according to the present invention is used with real RFID systems as just described. However, for simplicity the tag authentication protocol according to this invention, an example RFID system that consists of only three components: 1 RF tag, 1 reader, and 1 computer, will be described with reference to FIGS. 4A to 4G. It will be appreciated by those skilled in the art that this aspect of the invention may be implemented by a variety of methods and systems. However, to simplify the explanation of the nature of this aspect of the invention, a specific embodiment is described.

Referring now to FIG. 4A, an RFID tag reader 200 sends an encoded RF signal 11 or challenge to a tag 220. A listener (not shown) may be able to capture that signal and use it to capture data encoded on the tag 220. A third party could use the listener to generate a duplicate tag as described above. Even if the tag 220 were to require a password for access, the listener could still monitor the tag's behavior when the tag responds to the password inquiry. Clearly what is needed is a way to ensure that the authentic tag is the tag that is sending the response to the reader 200.

Figure 4B:
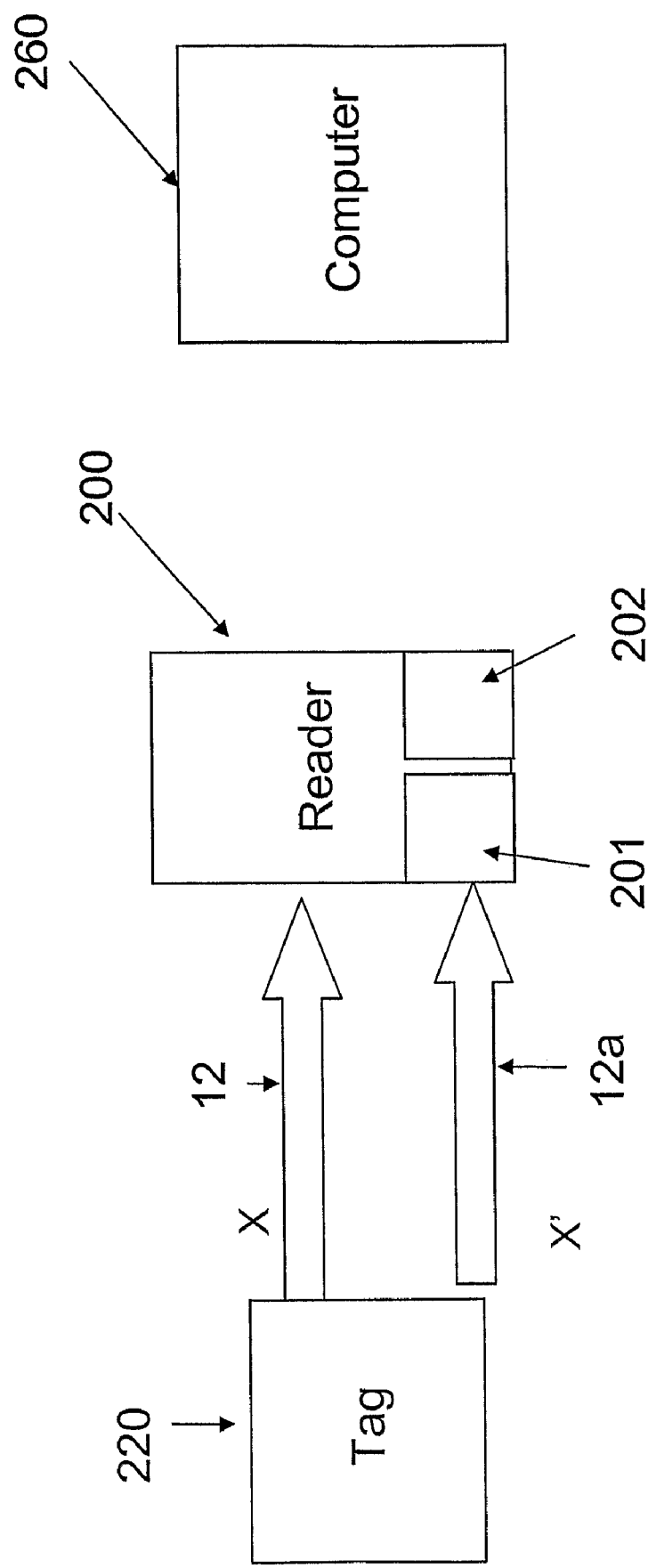
Figure 4C:
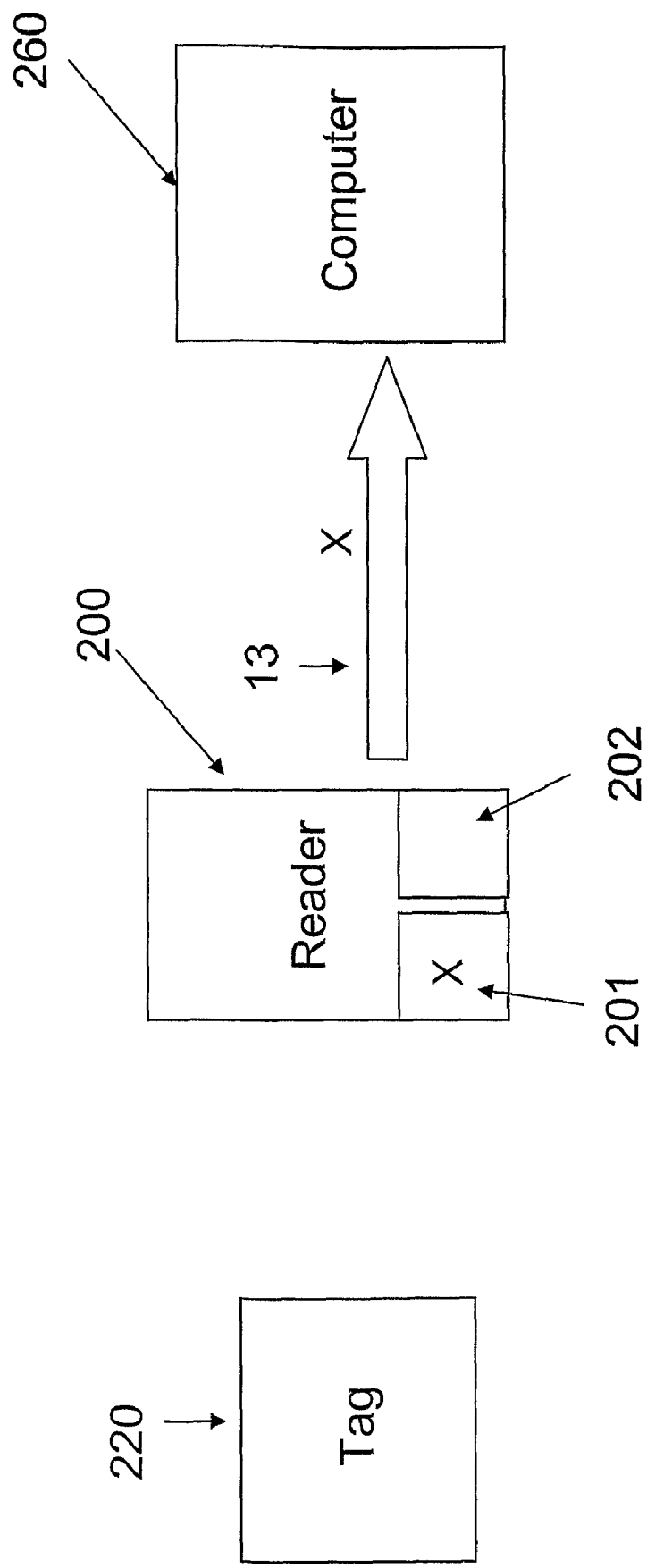
Figure 4G:
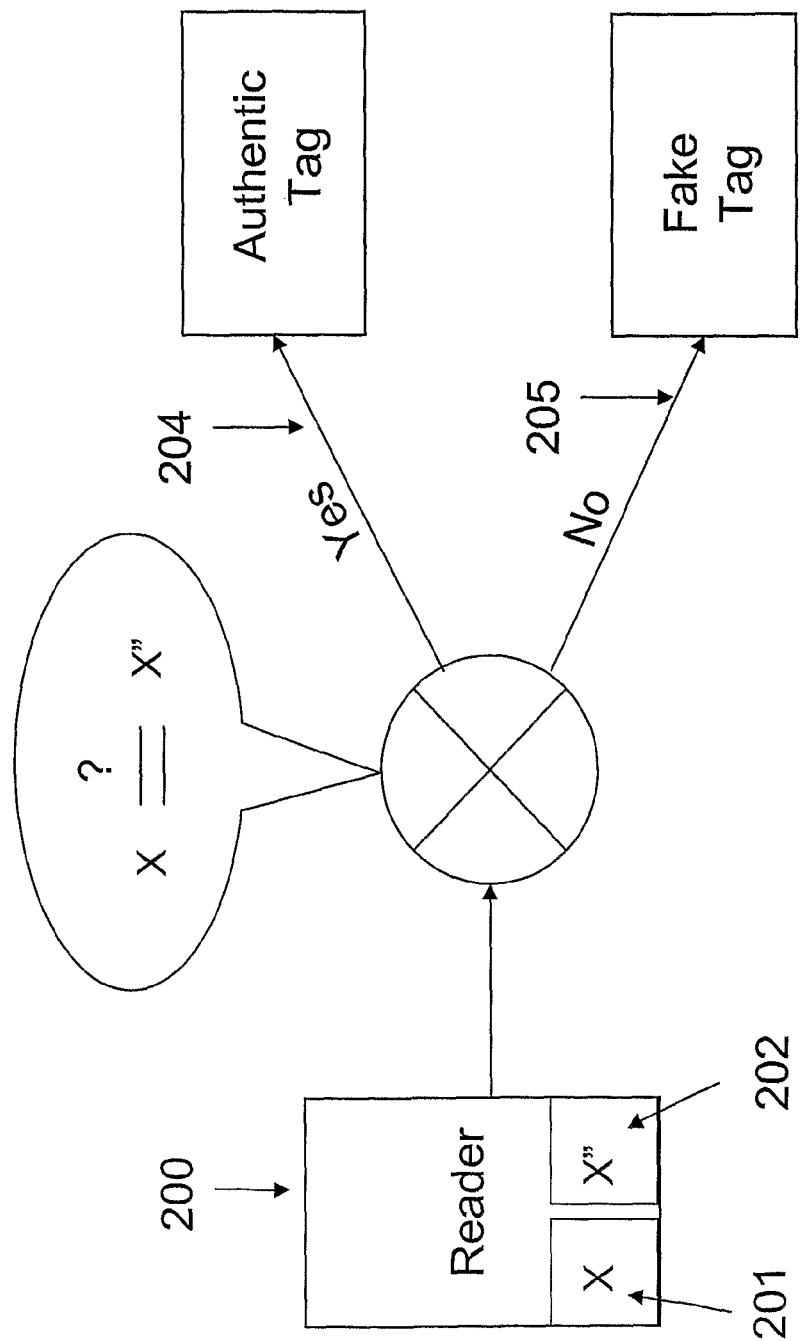

In the embodiment shown in FIG. 4A, the challenge 11 provides the tag 220 with a number to process. The tag processing system could use any mathematical function. Hash functions or sets of hash functions may be used for this purpose. The mathematical function preferably uses a secret. A secret is a number or function that is not broadcasted. In some embodiments a secret could be a seed value. The value of the secret affects the result of processing the mathematical function. The secret may be predetermined, autogenerated, generated by the CPRF algorithm, or sent to the tag by alternate device. The tag performs a function f(x) on the challenge which yields a value x'. The function f(x) is preferably a random function such as a hash function that is unknown to and not readily decipherable by a would-be hacker. The tag 220 sends at least the response, x' to the reader 200 as shown in FIG. 4B. The RFID tag reader 200 has a first memory 201 and a second memory 202 formed therein for storing the values x and x'. However, a single memory that can store the two numbers is sufficient. The reader 200 may then send the challenge x to a verification device 260, as shown in FIG. 4C. The computer or verification device 260 performs the function f'(x)=x" on the number x. If the secrets are the same then f'(x)=f(x), which means x" and x' will be equal. The verification device 260 sends the value x" to the reader 200. The reader which now has the values x' and x", compares x' to x" as shown in the bubble 203 in FIG. 4F. If x' equals x" then the tag is authentic, as shown by the decision arrow 204 in FIG. 4G. If x' and x" are not the same, then tag is counterfeit or fake, as shown by the decision arrow 205.

Alternatively, the reader 200 may send the response x' to the verification device 260. Using a reverse function F(x), the verification device 260 can generate the challenge x. If the challenge determined by the verification device 260 equals the challenge sent to the tag, the tag is genuine.

The secret stored in the tag and the verification device must be same for the result of the function to be same. The secret could be the order of processing, a number to process, an operation, specify a hash table, or any other variable or function.

In order to further clarify the above-described authentication process, the following is an example using an integer and a defined function.

For x=5. f(x)=(x*2)+7. f'(x)=(x*2)+9

The challenge is 5, the function is f(x), the secret is 7, and the response is 17. The tag 220 may have generated the number 7 using the CPRF algorithm described above. The tag then performs f(x) and finds f(x) equals 17. The tag 220 may then "17" to the reader 200. In one embodiment, the reader sends "5" to the verification device 260. The verification device performs the function f'(x) which yields "19" and sends that value to the reader 200. The reader 200 then compares 17 and 19 and decides that they are different and therefore, that the tag is counterfeit. A simple function such as the one illustrated may provide only limited defense to a persistent hacker, but a more complicated function such as a hash function would make reverse engineering the function significantly more difficult.

The movement and processing of information across the RF items, the tag, reader, and computer may be altered or arranged as preferred by the user. Some of the alternative methods and systems are: 1) allowing the tag to send information directly to the server as opposed to the reader, 2) allowing the reader to process f'(x), 3) instructing the verification device to compare the tag's number and reader's number, 4) eliminating the computer completely and allowing the reader to perform f'(x) and make the comparisons, and 5) having the system employ a wide variety of procedures from sounding an alarm, notifying security, to simply denying access to the tag's information.

This protocol helps ensure the authenticity of the tag. As previously described, this protocol advantageously uses the CPRF system to generate the random number. In addition to both of the protocols, a third system, Noisy Bloom Filters, can be combined with either or both of these systems to produce a more secure system.

Noisy Bloom Filters

Figure 5A:
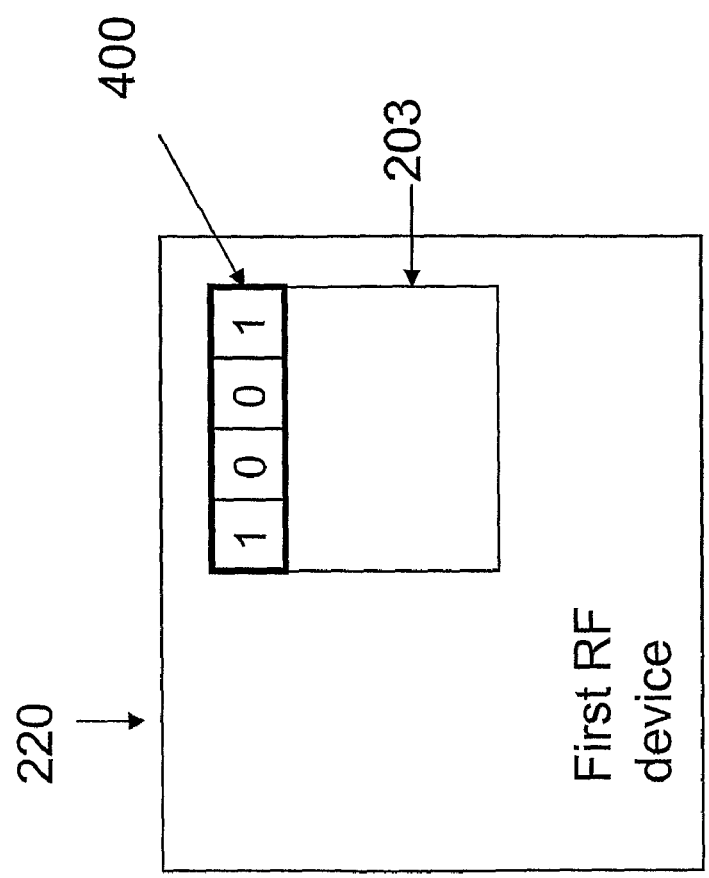

Another way to improve the security of RF transmissions and specifically verify the identity of RFID tag is to use Bloom Filters or Noisy Bloom Filters. As shown in FIG. 5A, a first RF device 220 that has a memory 203 for storing a binary number 400. In the embodiment depicted in FIGS. 5A-5K, the binary representation of the arabic number 17 is used for illustrative purposes only. This aspect of the present invention will be described with reference to the communications between the first RF device 220, such as an RFID tag and a second RF device, such as a transceiver or a tag reader, 200, but the Bloom Filter process could be used with other arrangements. For example, the first RF device may be a tag reader and the second RF device may be a computer or server.

Figure 5B:
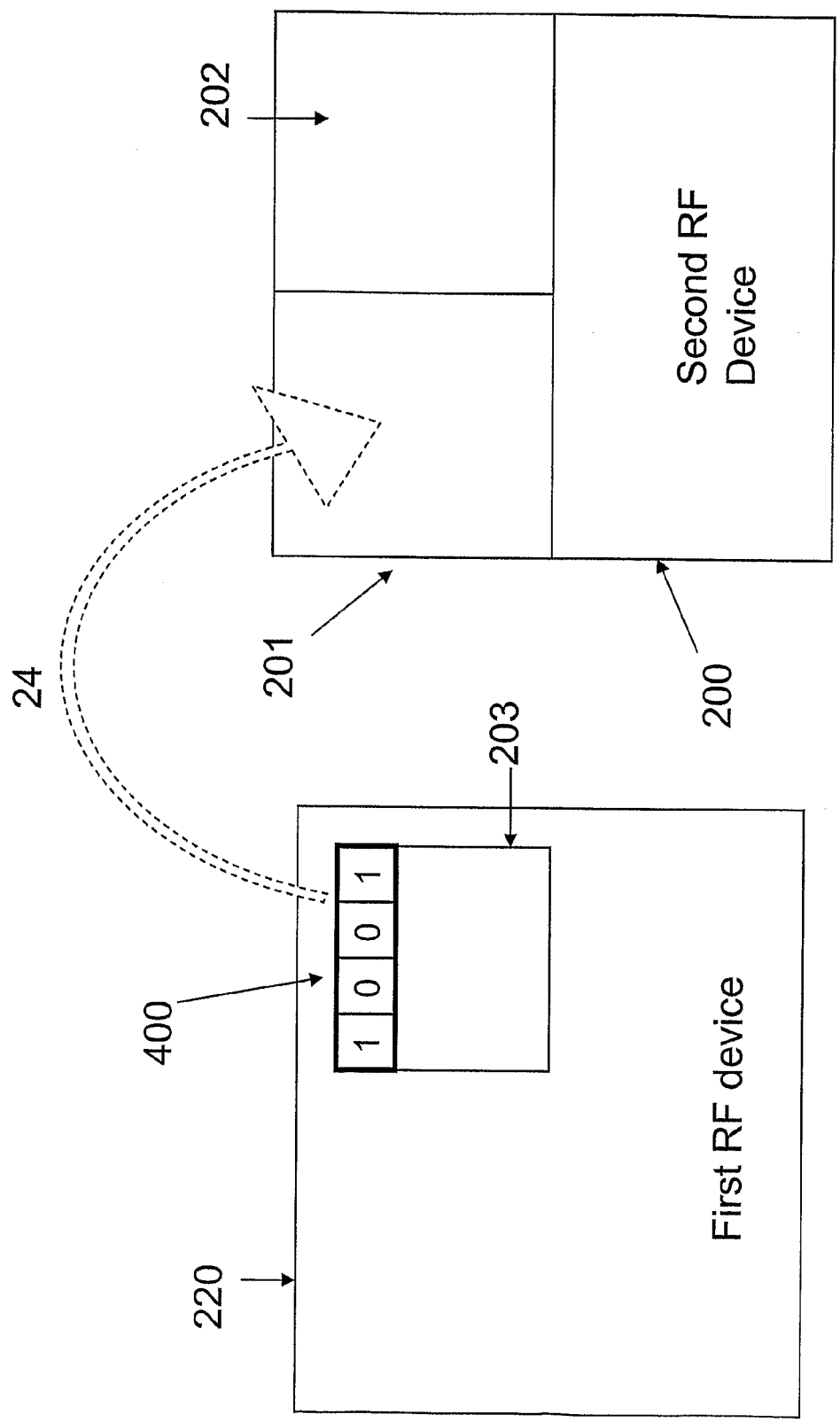
Figure 5C:
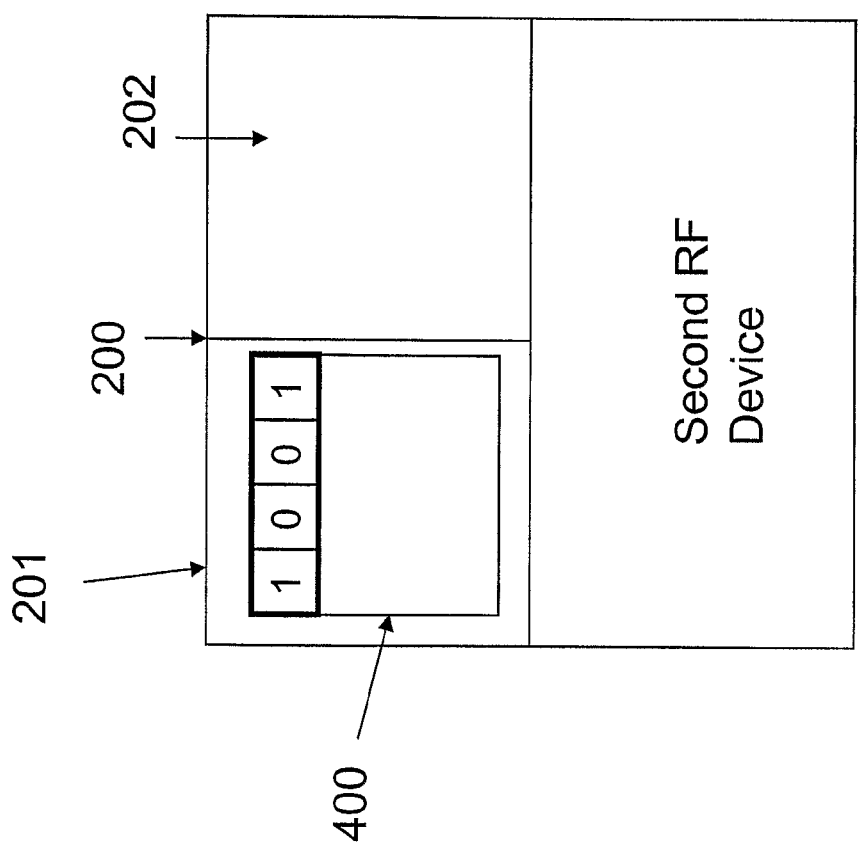
Figure 5D:
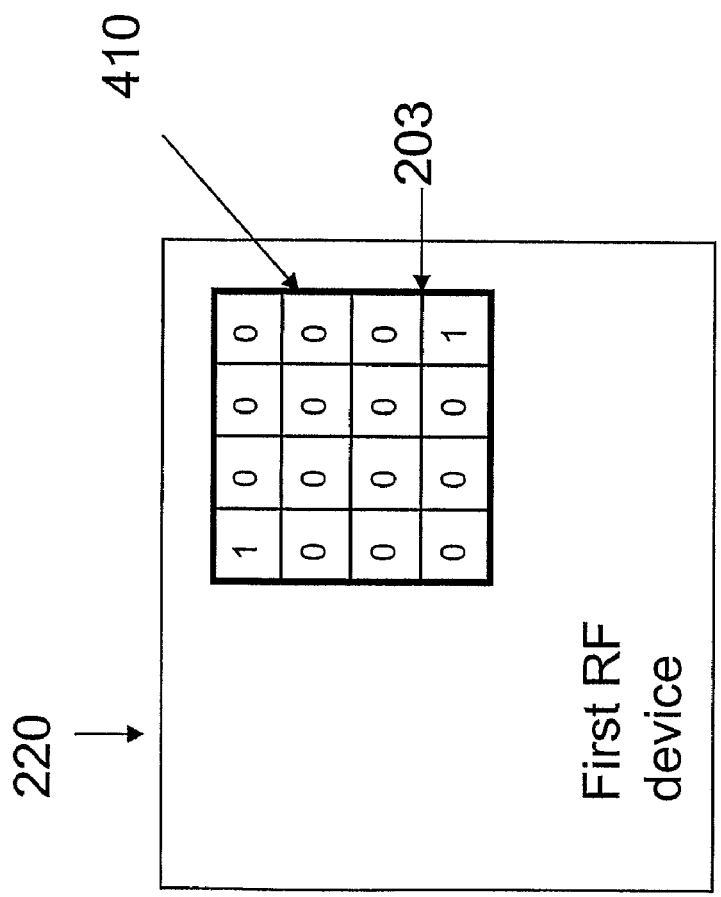
Figure 5E:
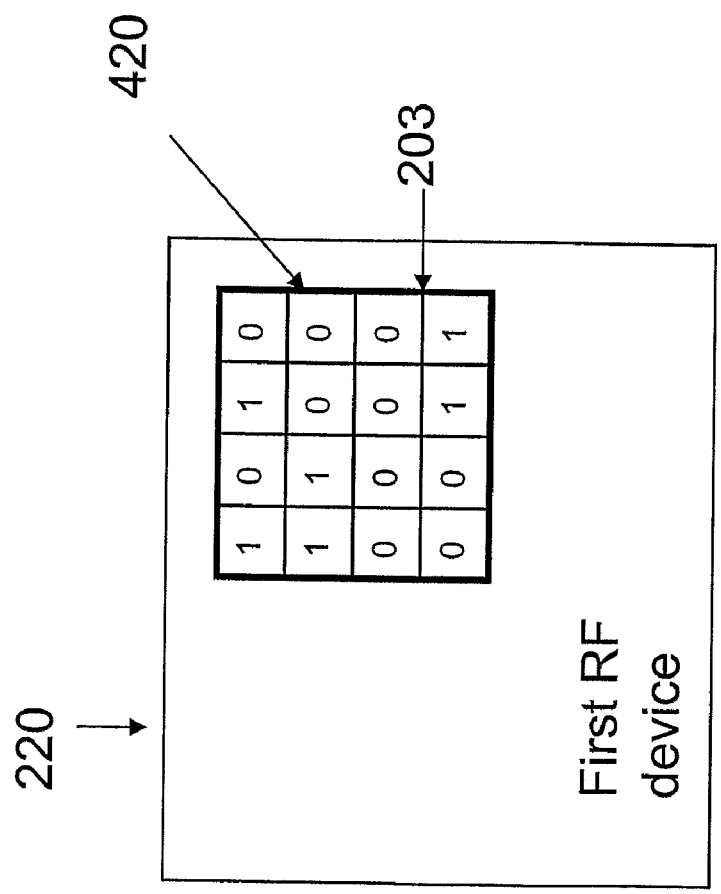
Figure 5F:
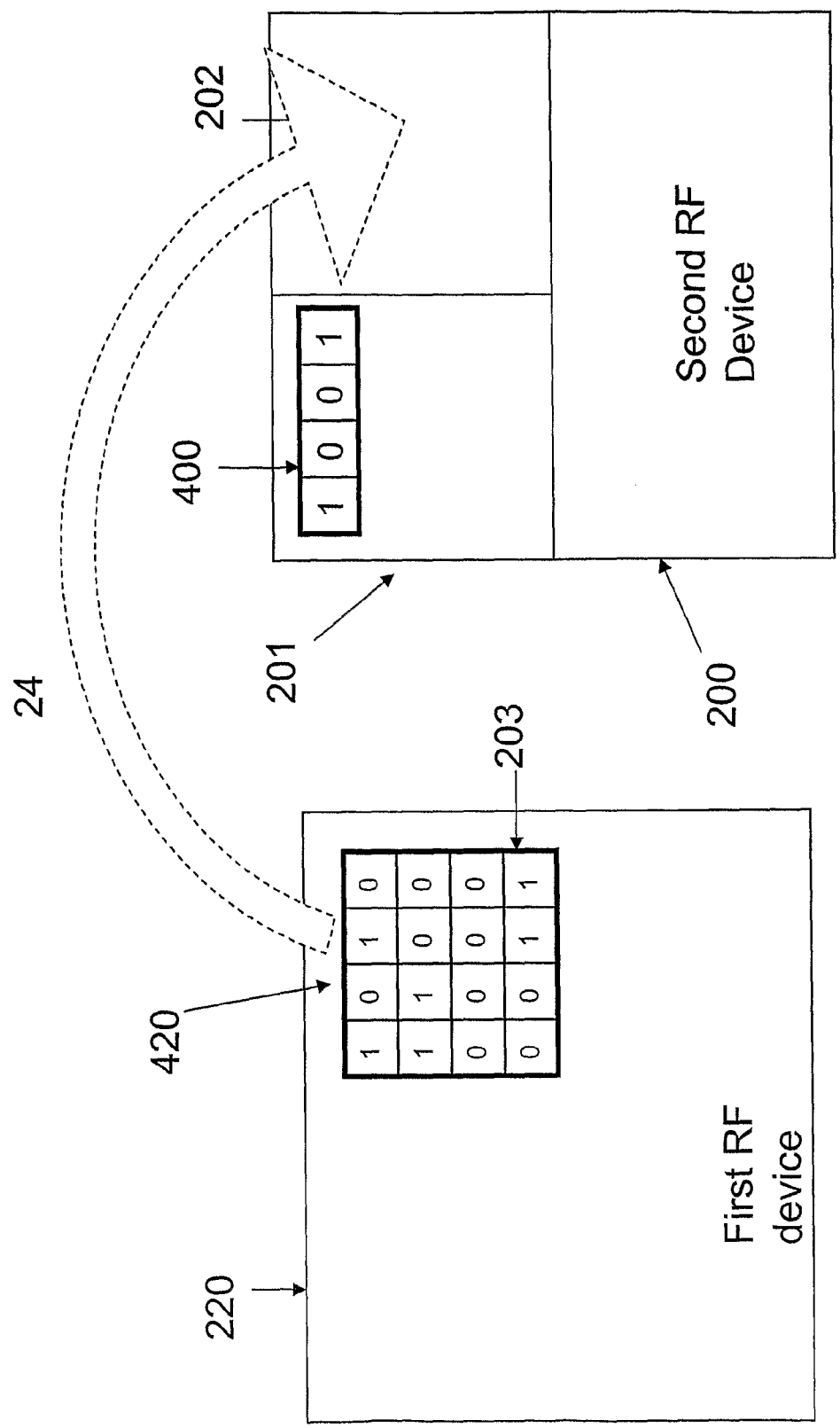

A Noisy Bloom Filter according to this invention specifies the use of a set of hash functions to represent a number in binary or another numbering system. As can be appreciated by those having ordinary skill the art, any numbering scheme can be used. To start the process, the second RF device 200 may send a challenge to the first RF device 220. The challenge 400 stored in the memory 203 of the first RF device 220 is transmitted to the second RF device 200, as shown in FIG. 5B. FIG. 5C shows the second RF device 200 with the challenge 400 stored in its memory 201. The challenge 400 is processed in the first RF device 220 as shown in FIG. 5D by expanding the challenge. The expansion of the challenge is accomplished by performing a set of K independent hash functions $H_K(x)$ with output values of 0 or 1, which are stored in the memory 203 as a first set of K hash tables 410. The set of hash tables constitutes a Bloom Filter. A Noisy Bloom Filter is created by changing a limited number of the zeroes to ones in the tables randomly to generate a second set of hash tables 420 as shown in FIG. 5E. This step makes the pattern more difficult to reverse engineer. The number of the zeroes that are changed can also be calculated by the Controlled Physical Random Function. The noisy hash tables 420 formed are then transmitted to the second RF device 200 as shown in FIG. 5F. Although in the illustrated embodiment the first RF device generates the Bloom filter, a computer, a reader, or another device could be used to generate the hash tables 410.

Figure 5G:
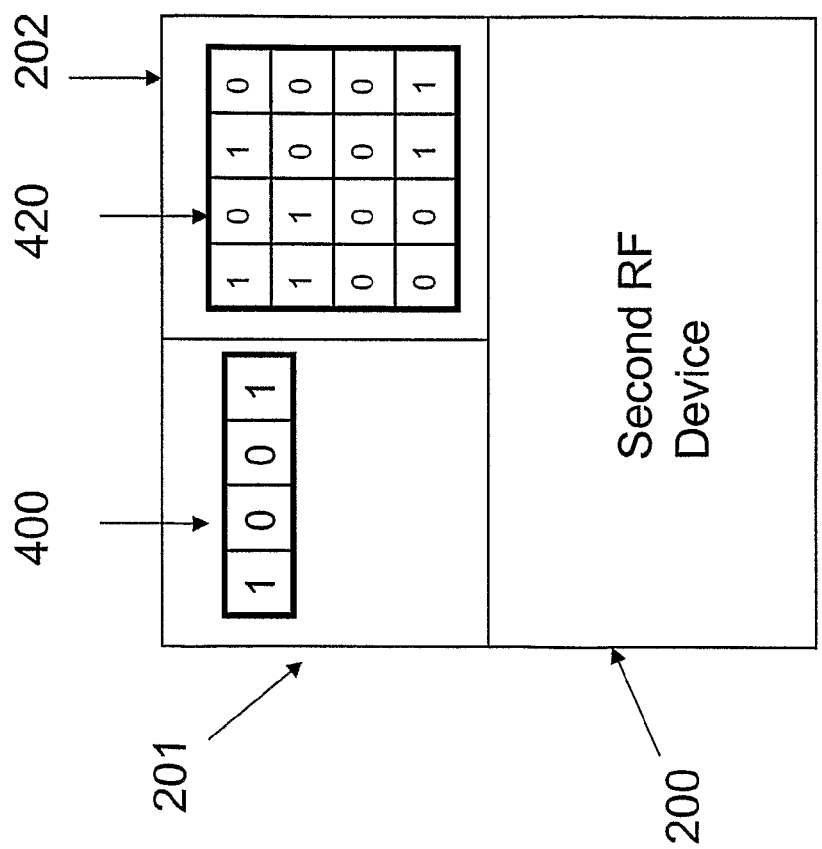
Figure 5I:
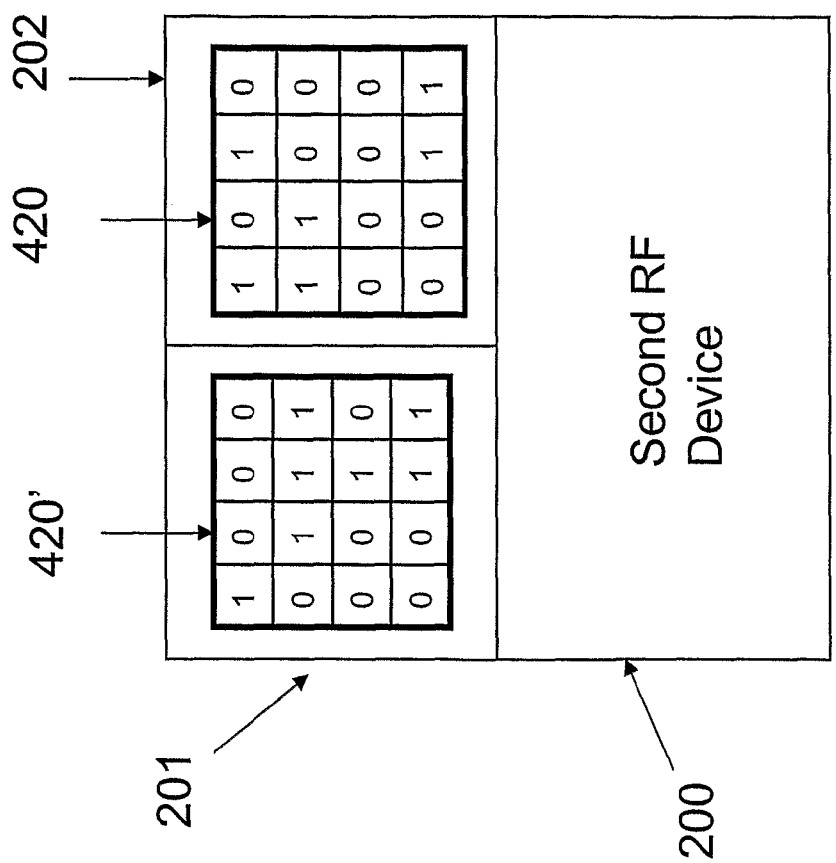

Either way, the second RF device 200 receives the set of noisy hash tables and stores them in its memory 202 as shown in FIG. 5G. The second RF device 200 then performs a Bloom Filter operation on the challenge 400 as shown in FIG. 5H. To do so, the second RF device applies $H_K(x)$ to the set of K hash tables 410 to make a noisy hash table 420' as shown in FIG. 5I. The second RF device 200 then compares the first set of hash tables 420 to the second set of hash tables 420' as shown in FIG. 5J. In most circumstances, the sets will not match, because of the random placements of the '1's' in the sets of hash tables. However, provided the randomization function is of a reproducible nature, the two noisy tables will have a certain threshold of similarity. The second RF device 200 preferably uses a threshold comparison system to determine whether the Noisy Bloom Filter results are sufficiently similar. If they are sufficiently similar, as represented by the 'Yes' branch 404, then it can be concluded that the first RF device 220 is authentic. If the sets are not sufficiently similar, as represented by the 'No' branch 405, then the first RF device 220 is determined to be counterfeit or fake.

The Noisy Bloom Filtering Process can be used in conjunction with the RFID tag authentication technique described above to verify the authenticity of RFID tags, and can be used with the Controlled Physical Random Function to generate random numbers for use in the authentication process. Also, the Noisy Bloom Filter can be used to verify the authenticity of the transceiver by performing the process with a computer. In that arrangement, the transceiver generates the first set of hash tables and the computer generates the second set of hash tables.

It will be recognized by those skilled in the art that changes or modifications may be made to the above-described embodiments without departing from the broad inventive concepts of the invention. It is understood, therefore, that the invention is not limited to the particular embodiments described, but is intended to cover all modifications and changes within the scope and spirit of the invention as described above and set forth in the appended claims.

What is claimed is:

1. A method of providing security in an RFID system comprising the following steps:
    a. transmitting a challenge to an RFID tag;
    b. generating a first response at the RFID tag by performing at least one mathematical function using the challenge and a secret;
    c. transmitting data to a verification device;
    d. using a secret stored in the verification device and the transmitted data to generate a second response at the verification device;
    e. comparing the first response to the second response; and then
    f. determining the authenticity of the RFID tag based on said comparing step;
    g. transmitting said challenge to the verification device;
    h. providing the RFID tag with an integrated circuit which comprises a plurality of conductive traces;
    i. providing a set of instructions incorporated into a memory of the integrated circuit installed on the RFID tag, said set of instructions including instructions to send an electric signal across each of a pair of said conductive traces;
    j. measuring the amount of time for electricity to flow across the first conductive trace;
    k. measuring the amount of time for electricity to flow across the second conductive trace;
    l. comparing the times measured in steps j. and k.; and then
    m. generating a digit of the secret based on said time comparison step.

2. A method as set forth in claim 1 wherein the step of using a secret further comprises the step of performing a mathematical function using the secret and the challenge to generate said second response.

3. A method as set forth in claim 1 further comprising the step of transmitting said first response to the verification device.

4. A method as set forth in claim 3 further comprising the step of performing calculations at the verification device which determine the challenge based on the response and the secret.

5. A method as set forth in claim 1 wherein the verification device performs the step of comparing.

6. A method as set forth in claim 1 wherein a RFID reader performs the step of comparing.

7. A method as set forth in claim 1 wherein the mathematical function is at least one hash function and the secret is a component of the hash function.

8. A method as set forth in claim 1 wherein the step of generating the first response comprises the steps of:
    a. generating a random number in the RFID tag; and
    b. storing the random number as the secret of the tag.

9. The method set forth in claim 1 comprising the step of repeating steps j., k., l., and m. a preselected number of times.

10. The method set forth in claim 1 wherein after the step of generating a digit, additionally performing the following steps:
   a. measuring the amount of time for electricity to flow across a third conductive trace;
   b. measuring the amount of time for electricity to flow across a fourth conductive trace;
   c. comparing the times measured for electricity to flow across the third and fourth conductive traces; and then
   d. generating a second digit of the secret based on said time comparison step.

11. A method as set forth in claim 1 further comprising the following steps:
   a. performing a set of hash functions on said challenge by incorporating said secret into said hash tables
   b. applying a result modification function that modifies the result generated in step a, by changing a first class of characters into a second class of characters.
   c. transmitting the challenge to the second RF device;
   d. performing a second set of hash functions on the challenge;
   e. comparing the result generated by the first RF device and the result generated by the second RF device; and
   f. determining the authenticity of the first RF device based on said comparing step.

12. A method as set forth in claim 1 further comprising the following steps:
   a. performing a set of hash functions on said challenge by incorporating said secret into said hash tables;
   b. applying a result modification function that modifies the result generated in step a, by changing a first class of characters into a second class of characters;
   c. transmitting the result of step b to a second RF device;
   d. performing a second set of hash function on the challenge to determine the initial challenge;
   e. comparing the challenge sent to the first RF device and the challenge generated by the second RF device; and
   f. determining the authenticity of the first RF device based on said comparing step.

13. A method as set forth in claim 11 or 12 further comprising the steps of:
   a. providing the first RF device tag with an integrated circuit which comprises a plurality of conductive traces;
   b. providing a set of instructions incorporated into a memory of the integrated circuit installed on the first RF device, said set of instructions including instructions to send an electric signal across each of a pair of said conductive traces;
   c. measuring the amount of time for electricity to flow across the first conductive trace;
   d. measuring the amount of time for electricity to flow across the second conductive trace;
   e. comparing the times measured in steps c. and d.; and then
   f. generating a digit of the secret based on said time comparison step.

14. The method set forth in claim 11 comprising the step of repeating steps c., d., e., and f. a preselected number of times.

15. An RFID system comprising:
   a. A first RF device which is capable of receiving a challenge from a RF transceiver, said device comprising a mathematical function and secret in memory, a processor which is designed to incorporate said secret in said function and calculate a first response based on the function, secret and challenge;
   b. A second RF device which is capable of receiving data from said transceiver, said second RF device comprising a mathematical function and secret in memory, a processor which is designed to incorporate said secret in said function and calculate a second response;
   c. A comparing system which determines the similarity of the first and second responses; and
   d. Said first device generates the secret by comparing the amount of the time required for the device to run electricity through at least one set of traces on the device.

16. An RFID system as set forth in claim 13 wherein the first device comprises hardware that performs at least on hash function on the challenge to create a response.

17. An RFID system as set forth in claim 14 wherein the first device comprises hardware that can convert a preselected number of a first class of characters into a preselected set of second characters.

* * * * *